(12) United States Patent
Goldner et al.

(10) Patent No.: US 6,982,132 B1
(45) Date of Patent: Jan. 3, 2006

(54) RECHARGEABLE THIN FILM BATTERY AND METHOD FOR MAKING THE SAME

(75) Inventors: Ronald B. Goldner, Lexington, MA (US); Te-Yang Liu, Arlington, MA (US); Mark A. Goldner, Boston, MA (US); Alexandra Gerouki, Medford, MA (US); Terry E. Haas, Southborough, MA (US)

(73) Assignee: Trustees of Tufts College, Medford, MA (US)

( * ) Notice: Subject to any disclaimer, the term of this patent is extended or adjusted under 35 U.S.C. 154(b) by 364 days.

(21) Appl. No.: 09/638,444

(22) Filed: Aug. 14, 2000

Related U.S. Application Data

(63) Continuation-in-part of application No. 08/951,085, filed on Oct. 15, 1997, now abandoned.

(51) Int. Cl.
*H01M 10/36* (2006.01)
*H01M 10/38* (2006.01)
*H01M 4/48* (2006.01)
*H01M 4/58* (2006.01)
*C23C 14/48* (2006.01)

(52) U.S. Cl. ............... 429/162; 429/152; 429/160; 429/231.1; 429/231.3; 429/231.8; 429/245; 429/319; 429/322; 29/623.5; 204/192.11

(58) Field of Classification Search ............ 429/149, 429/152, 160, 161, 162, 319, 322, 231.1–231.4, 429/231.8, 231.95, 245, 218.1; 29/623.1, 29/623.5; 204/192.11
See application file for complete search history.

(56) References Cited

U.S. PATENT DOCUMENTS

| | | | |
|---|---|---|---|
| 4,366,215 A | * | 12/1982 | Coetzer et al. ............ 205/57 |
| 4,832,463 A | | 5/1989 | Goldner et al. |
| 4,876,628 A | | 10/1989 | Goldner et al. |
| 4,889,414 A | | 12/1989 | Rauh et al. |
| 4,902,110 A | | 2/1990 | Green |
| 5,051,274 A | | 9/1991 | Goldner et al. |
| 5,110,696 A | * | 5/1992 | Shokoohi et al. ........ 429/231.1 |
| 5,133,594 A | | 7/1992 | Haas et al. |
| 5,171,413 A | | 12/1992 | Arntz et al. |
| 5,189,550 A | | 2/1993 | Goldner et al. |
| 5,202,788 A | | 4/1993 | Weppner |
| 5,253,101 A | | 10/1993 | Demiryont |
| 5,300,373 A | * | 4/1994 | Shackle .................... 429/152 |
| 5,338,625 A | | 8/1994 | Bates et al. |
| 5,445,906 A | | 8/1995 | Hobson et al. |
| 5,455,126 A | | 10/1995 | Bates et al. |

(Continued)

OTHER PUBLICATIONS

M. Thomas et al., "Lithium Mobility in the Layered Oxide Li(1-X)CoO2," Solid State Ionics, vol. 17: 13-19 (1985).

(Continued)

*Primary Examiner*—Jonathan Crepeau
(74) *Attorney, Agent, or Firm*—R. Dennis Creehan, Esq.

(57) ABSTRACT

A rechargeable, stackable, thin film, solid-state lithium electrochemical cell, thin film lithium battery and method for making the same is disclosed. The cell and battery provide for a variety configurations, voltage and current capacities. An innovative low temperature ion beam assisted deposition method for fabricating thin film, solid-state anodes, cathodes and electrolytes is disclosed wherein a source of energetic ions and evaporants combine to form thin film cell components having preferred crystallinity, structure and orientation. The disclosed batteries are particularly useful as power sources for portable electronic devices and electric vehicle applications where high energy density, high reversible charge capacity, high discharge current and long battery lifetimes are required.

40 Claims, 8 Drawing Sheets

U.S. PATENT DOCUMENTS

| | | | |
|---|---|---|---|
| 5,498,489 A * | 3/1996 | Dasgupta et al. ........... | 429/152 |
| 5,512,147 A | 4/1996 | Bates et al. | |
| 5,512,387 A | 4/1996 | Ovshinsky | |
| 5,532,869 A | 7/1996 | Goldner et al. | |
| 5,561,004 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,686,203 A * | 11/1997 | Idota et al. .............. | 429/218.1 |
| 5,789,111 A * | 8/1998 | Ozaki et al. ................ | 252/502 |
| 5,908,715 A * | 6/1999 | Liu et al. .................... | 429/217 |
| 6,168,884 B1 * | 1/2001 | Neudecker et al. ......... | 429/104 |
| 6,242,129 B1 * | 6/2001 | Johnson ...................... | 429/162 |

OTHER PUBLICATIONS

R. Gummow et al., "Lithium-cobalt-nickel-oxide Cathode Materials Prepared at 400 Degrees C for Rechargeable Lithium Batteries," Solid State Ionics, vol. 53-56: 681-687 (1992).

J. Bates et al., "Deposition of Electrolyte and Cathode Thin Films by Magnetron Sputtering," in Ceramic Thin and Thick Films, Proc. IEEE Micro Electro Mechanical Systems, IEEE (Ft. Lauderdale 1993), pp. 35-41.

J. Bates et al., "Fabrication and Characterization of Amorphous Lithium Electrolyte Thin Films and Rechargable Thin-film Batteries," Journal of Power Sources, vol. 43-44: 103-110 (1993).

E. Rosen et al., "Synthesis and Electrochemistry of Spinel LT-LiCoO2," Solid State Ionics, vol. 62: 53-60 (1993).

M. Thackeray, "Lithiated Oxides for Lithium-ion Batteries," Proc. Symp. Rechargable Lithium and Lithium-ion Batteries, ed. S. Megahed et al., pp. 233-243 (Oct. 1994).

J. Bates et al., "Rechargeable Thin-film Lithium Batteries," Solid State Ionics, vol. 70/71: 619-628 (1994).

J. Bates et al., "Thin-film Rechargeable Lithium Batteries," J. of Power Sources, vol. 54: 58-62 (1995).

B. Wang et al., "Characterization of Thin-film Rechargeable Lithium Batteries with Lithium Cobalt Oxide Cathodes," J. Electrochem. Soc., vol. 143, No. 10: 3203-3213 (Oct. 1996).

J. Bates et al., "Thin Film Rechargeable Lithium Batteries for Implantable Devices," ASAIO Journal, vol. 43: M644-M647 (1997).

R. Goldner et al., "Ambient Temperature Synthesis of Polycrystalline Thin Films of Lithium Cobalt Oxide with Controlled Crystallites Orientations," Proc. Symp. Selected Battery Topics, ed. W. Cieslak et al., vol. 98-15, pp. 268-273 (1999).

H. Wang et al., "TEM Study of Electrochemical Cycling-induced Damage and Disorder m LiCoO2 Cathodes for Rechargeable Lithium Batteries," J. Electrochem. Soc., vol. 146, No. 2: 473-480 (1999).

J. Bates et al., "Preferred Orientation of Polycrystalline LiCoO2 Films," J. Electrochem. Soc., vol. 147, No. 1: 59-70 (2000).

S. Levasseur, "Evidence for Structural Defects in Non-Stoichiometric HT-LiCoO2: Electochemical; Electronic Properties and Li NMR Studies," Solid State Ionics, vol. 128:11-24 (2000).

G. Wei, et al., "Thin films of lithium cobalt oxide", Solid State Ionics 58 (1992) 115-122.

R.B. Goldner, et al., "Properties of a Carbon Negative Electrode in Completely Inorganic Thin Film Li-Ion Batteries with al LiCoO2 Positive Electrode", Mat. Res. Soc.. Symp. Proc., vol. 369, pp. 137-147. 1995.

A. Gerouki, et al., "Density of States Calculations of Small Diameter Single Graphene Sheets", J. Electrochem. Soc., vol. 143, No. 11, pp. L262-L263, Nov. 1996.

R.B. Goldner, et al., "Some lessons learned from research on a thin film electrochromic window", Solid State Ionics 70/71 (1994) 613-618.

R.B. Goldner, et al., "Reflectance Modulation with Electrochromic Li(x)WO3 Films", Proceedings Symp., vol. 90-2, pp. 14-23, Electrochem. Society (1989).

T. Haas, et al., "Fundamentals of Electrochromism in Metal Oxide Bronzes", SPIE Institute Series, vol. IS 4, pp. 170-180 (1988).

R.B. Goldner, et al., "Progress on the variable reflectivity electochromic window", Proc. SPIE 1536:34 (Jul. 1994).

R.B. Goldner, et al., "A monolithic thin-film electrochromic window", Solid State Ionics 53-56 (1992) 617-627.

R.B. Goldner, et al., "Development of a Thin Film Li(1-x) CoO2/Li(x)C6 Rocking-Chair Battery", Electrochemical Society Proceedings vol. 95-22, pp. 173-182 (1995).

R.B. Goldner, et al., "Electrochromic Materials for Controlled Radiant Energy Transfer in Buildings", Solar Energy Materials v.11, No. 3, pp 177-185 (1984).

F.O. Arntz, et al., "Near-infared reflectance modulation with electrochromic crystalline WO3 films deposited on ambient temperature glass substrates by an oxygen ion-assisted technique", J. Appl. Phys. 67 (6), pp. 3177-3179, Mar. 15, 1990.

R.B. Goldner, et al., "High near-infared reflectivity modulation with polycrystalline electrochromic WO3 films", Appl. Phys. Lett. 43(12) pp. 1093-1095, Dec. 15, 1983.

R.B. Goldner, et al., "Optical Frequencies Free Electron Scattering Studies on Electrochromic Materials for Variable Reflectivity Windows", Solar Energy Materials 12 (1985) 403-410.

R.B. Goldner, et al., "Recent Research Related to the Development of Electrochromic Windows", Solar Energy Materials 14(1986) 195-203.

K.K. Wong, et al., "Characterization technique for transparent ion conducting films", SPIE vol. 823, pp84-89 (1987).

G. Wei, et al., "Lithium Cobalt Oxide Thin Film and Its Electrochromism", Proc. Electrochemical Society, v.90, No. 2, pp 80-88 (1989).

R. Weiss, "Tufts Develops 'Smart Window' Glass", Lasers & Optronics, Aug. 1991, pp 21-22.

M.M. Thackeray, "Structural Considerations of Layered and Spinel Lithiated Oxides for Lithium Ion Batteries", J. Electrochem. Soc., vol. 142, No. 8, pp 2558-2563, Aug. 1995.

C. Julien and G. Nazri, Solid State Batteries: Materials Design and Optimization, Kluwer Academic Publishers (Boston 1994), pp. 146-153, pp. 378-397, pp. 472-489, pp. 579-601, pp. 608-619.

R.B. Goldner, et al., "Thin Film Solid State Ionic Materials for Electrochromic Smart Window (TM) Glass", Solid State Ionics 28-30 (1988) 1715-1721.

G. Seward, et al., "Prototype all-solid lithiated smart window devices", SPIE vol. 823, pp. 90-100 (1987).

F.O. Arntz, et al., "Electrochromic Crystalline WO3 Films Prepared at Ambient Temperature by Ion Assisted Deposition", SPIE vol. 1149, pp. 40-45 (1989).

R.B. Goldner, et al., "Improved colored state reflectivity in lithiated WO3 films", SPIE vol. 823, pp. 101-105 (1987).

R.B. Goldner, et al., "Further Evidence for free electrons as dominating the behavior of electrochromic polycrystalline WO3 films", Appl. Phys. Lett. 47 (5), pp. 536-538, Sep. 1, 1985.

R.B. Goldner, "Attaining a solar energy economy with active thin film structures", J. Vac. Sci. Technol. A 13(3), pp. 1088-1094, May/Jun. 1995.

R.B. Goldner, et al., "Nuclear reaction analysis profiling as direct evidence for lithium ion mass transport in thin film 'rocking-chair structures", Appl. Phys. Lett. 62 (14), pp. 1699-1701, Apr. 5, 1993.

G. Berera, et al., "A Study of the Optical Band Gap of Lithium Tungsten Trioxide Thin Films", Mat. Res. Soc. Symp. Proc. vol. 210, pp. 69-74, 1991.

R.B. Goldner, et al., "A Transient Method for Measuring Diffusion Coefficients of Thin Film Battery Electrodes", J. Electrochem. Soc., vol. 143, No. 6, pp. L129-L130 (1996).

R.B. Goldner, et al., "Electrochromic behavior in ITO and related oxides", Applied Optics, vol. 24, No. 15, p. 2283, Aug. 1, 1985.

L.T. Kenny, et al., "The Preparation and Characterization of Lithium Cobalt Oxide Thin Films by LPCVD", Materials Research Soc. Symp. Proc., v.415, pp 213-217 (1996).

T.E. Haas, et al. "Preparation, Characterization and Electrochromism of Thin Film Lithium Cobalt Oxides", 18th Northeast Regional Meeting American Chemical Society, Jul. 31-Aug. 3, 1988, Program and Abstracts, Abstract No. 111, p. 63 (1988).

Anonymous, "Researchers Develop 'Smart' Window to Cut Energy Consumption", The New York Times, C4, Sep. 29, 1982.

Ralph Mcelroy Translation Company (translator), U.S. Patent and Trademark Office commissioned traslation of Japanese Kokai Patent Application No. Hei 8[1996]-236105 entitled "Method for Manufacturing Positive Electrode of Lithium Secondary Battery"to H. Kirimura, et al., Translation No. PT099-4532, Jul. 1999.

* cited by examiner

RECHARGEABLE THIN FILM BATTERY AND METHOD FOR MAKING THE SAME

CROSS-REFERENCE

This is a Continuation-in-Part of U.S. patent application Ser. No. 08/951,085, filed Oct. 15, 1997 now abandoned.

GOVERNMENT RIGHTS

The invention described herein was supported in part with U.S. Government funding under Department of Energy contracts DE-FG02-95ER14578 and DE-FG03-85SF15927. The U.S. Government has certain rights to this invention.

FIELD OF THE INVENTION

This invention relates to thin film batteries and methods for their manufacture. More particularly, this invention relates to rechargeable, stackable, solid-state, thin film lithium battery cells and batteries having high cell voltage, high reversible charge capacity, long charge cycle lifetimes, high charge density, high specific energy and energy density, high breakdown voltage, and low spreading resistance.

BACKGROUND OF THE INVENTION

Rechargeable batteries are generally known and used in a variety of commercial, automotive, industrial and consumer applications where the use of compact, light weight, high capacity and extended charge life portable power sources are desirable. For certain applications, such as computers, electronic devices, and electric vehicles, both size and weight are critical factors in selection of a suitable battery material.

Current battery technology comprises essentially two general classes of batteries, liquid electrolyte batteries and solid electrolyte batteries. Polymer electrolyte batteries are generally considered as hybrid class of liquid electrolyte batteries. Liquid electrolyte battery technology is well known in the art. Typical commercial examples of these battery types are lead-acid, nickel cadmium, and nickel metal hydride cells and commercial lithium batteries.

In liquid electrolyte batteries, the electrolyte provides for ion transport between the cathode and anode. Typically, the amount of energy stored and retrievable from a conventional electrolyte battery is directly proportional to battery size and weight. For example, a Pb-acid automotive battery is capable of producing large amounts of current but such batteries typically have relatively low energy density and specific energy due their large volume and weight. Additionally, the corrosive liquid electrolytes employed by these batteries require complex packaging and sealing which add dead weight and dead volume. Since liquid electrolytes are employed in these batteries, their operating temperatures are generally limited by the freezing point and boiling point of the liquid electrolyte and they are unsuitable for applications in severe environments such as desert or artic climates, deep sea, high altitude or space applications.

More recently, advances in anode, cathode, and electrolyte materials and materials fabrication methods have led to the development of polymer electrolyte batteries and solid-state electrolyte batteries. While polymer electrolyte batteries offer improvements over conventional liquid electrolyte batteries due to weight and size reductions which result in reduction of dead weight and volume, these batteries generally exhibit similar corrosion problems as liquid electrolyte batteries where the corrosive electrolytes which are employed react with anodes and cathodes and lead to rapid degradation of battery charging performance, reversible charge capacity and charge cycle lifetime.

Solid state batteries have a number of preferred advantages over liquid electrolyte batteries and polymer electrolyte batteries. Since no corrosive electrolyte materials are employed, corrosion problems are eliminated and simplified packaging and sealing of battery cells is possible, eliminating unnecessary dead weight and volume. Due to the elimination of corrosion problems by employing solid-state electrolytes, electrolyte reactions with anodes and cathodes are eliminated resulting in stable charge capacities, high reversible charge capacity after extended cycling, and long battery lifetimes. Thus, solid-state batteries are theoretically capable of much higher energy densities and specific energies than liquid or polymer electrolyte batteries. In addition, solid-state batteries are capable of operating in temperature ranges which extend beyond either the freezing point or boiling point of a liquid electrolyte. For this reason, solid-state electrolyte batteries are particularly useful in severe environment applications in space, high altitudes, deep sea, desert or arctic climates.

Unlike commercial bulk batteries, which have relatively forgiving tolerances, the relatively slow solid-state ion diffusion kinetics and transport dimension constraints placed on electrolyte, anode and cathode film thickness and spacing in thin film, solid-state batteries impose demanding tolerances in the quality, structure, orientation and properties of as-deposited thin film electrolyte, anode and cathode layers. Since solid-state ion diffusion and transport through solid electrolytes is typically orders of magnitude slower than diffusion in liquid electrolytes, minimizing the thickness of the thin film electrolyte and the resultant spacing between anode and cathode is necessary for acceptable solid-state battery performance. Typically, the thickness of thin film electrolytes and spacing between electrodes in these batteries range from one to two microns in order to minimize ion diffusion distances and provide adequate transport kinetics for acceptable current densities. In contrast, typical electrolyte, anode and cathode dimensions and electrode spacing in commercial liquid and polymer electrolyte batteries generally range from hundreds of microns to tens of centimeters.

Since many candidate electrode materials for thin film batteries have hexagonal lattice structures, they are highly anisotropic and solid-state ion transport and diffusion kinetics are strongly dependent on crystallographic orientation. Thus, the crystallographic orientation of as-deposited films relative to the electrode-electrolyte interface is critical to efficient ion transport and optimum performance. For anisotropic hexagonal lattices, the fastest ion diffusion path is typically within the c-plane which is perpendicular to the c-axis. Ion diffusion parallel to the c-axis is generally orders of magnitude slower. This creates an imposing technical challenge in fabricating thin film electrodes as the orientation of as-deposited films is critical to acceptable performance. Since lattice anisotropy typically controls crystal nucleation and growth kinetics during film deposition, thin films deposited by conventional deposition methods typically retain preferential crystallographic orientation. Thus, for hexagonal materials deposited by conventional deposition processes, nucleation and growth typically occur with the c-axis perpendicular and c-plane parallel to the deposit substrate, an orientation which is particularly unsuitable for acceptable ion transport and battery performance.

In addition to the crystallographic orientation of electrode films, the interfacial contact area, orientation, and structure of electrode-electrolyte interfaces are critical for promoting rapid ion exchange between electrodes and electrolyte, eliminating ion buildup and transport bottlenecks within the cell, and minimizing cell impedance. Thus, deposition methods which maximize film layer interfacial contact area, provide for preferred or random film layer orientations, and produce intimate contact and bonding of layers are particularly desirable. By providing unimpeded ion transport across electrolyte-electrode interfaces, ion buildup and increased local potential created by high space-charge density, which may lead to decomposition of both electrolytes and electrodes, are eliminated. Such interfaces provide for thin film electrochemical cells and batteries having a high decomposition potential due to the enhanced stability of the electrolyte-electrode interfaces where cell potential is highest.

Generally, conventional deposition processes provide little control over thin film interface orientation and structure. Thin film interfaces formed by these methods are typically driven by natural nucleation and growth processes which produce undesirable film layer orientations, layer mismatches, and poor interfacial contact and bonding, resulting in lower effective contact area between layers. The resulting interfaces produced by conventional methods create impediments to rapid and efficient ion transport through the cell and result in increased cell impedance and reduced charge capacity. Additionally, due to impediments to ion transfer across the electrode-electrolyte interface, such interfaces are intrinsically unstable due to ion buildup at the interface which produces a high space charge density and higher electric field. These conditions may lead to decomposition reactions at the electrolyte-electrode interface with a resulting lower decomposition potential for the thin film cell and battery.

In addition to crystallographic orientation and interface structure, the crystallinity of as-deposited anode, cathode and electrolyte films is critical to overall performance in thin film batteries. Generally, with anisotropic materials, isotropic ion transport through fine grain, polycrystalline films with random grain orientation is faster than ion transport through coarse grain films which are strongly oriented. Since thin film battery structures are intrinsically anisotropic, in that they require ion transport in an orthogonal direction to the electrode-electrolyte interfaces, deposition processes which produce coarse grain films with c-axis orientations orthogonal to the electrode-electrolyte interfaces are undesirable. Conventional deposition methods which produce amorphous deposits may require subsequent, post-deposition annealing treatments to crystallize the as-deposited films. Generally, there is little control over post-anneal crystallographic orientations with these methods as the orientation of recrystallized, as-deposited films is typically established by natural growth processes leading to undesirably oriented films. Additionally, such treatments typically require high temperatures which can damage underlying film layers by promoting reactions between film layers or grain growth and coarsening of film layers. Deposition methods which produce deposits with coarse grain structures are more likely to form films with undesirable crystallographic orientations dominated by natural nucleation and grain growth processes.

In addition to orientation, interface structure and crystallinity requirements, the component film layers and layer interfaces in thin film cells and batteries must be both thermomechanically and "electromechanically" stable. Film layers and their interfaces must be sufficiently robust to withstand anticipated temperature changes encountered both during fabrication and operation of the batteries. For thermomechanical stability, thermal expansion coefficients and differences between thermal expansion coefficients of film layers and substrate materials must be factored in material selection to avoid thermal expansion mismatches which may produce sufficiently large stresses to cause cracking within the films or at film interfaces. For electromechanical stability, since solid state battery performance requires reversible transport, storage and removal of large quantities of ions during normal operation, solid-state phase transformations and accompanying volume changes must be considered in electrode material selection to minimize film expansion and associated strain which may produce sufficiently large stresses to cause cracking within film layers or between layers. In addition to material considerations, deposition methods which provide for dense, non porous films with minimal defects, strong interfacial bonding and intimate contact between film layers would be particularly advantageous for minimizing film or interfacial fractures caused by anticipated thermomechanical and electromechanical strain and stress.

Thus, a deposition method which provides for overcoming natural thin film nucleation and growth processes for control of crystallographic orientation, interface structure and bonding, crystallinity and grain sizes in thin film deposits would be particularly advantageous for the development and commercialization of thin film batteries.

A particularly useful review of current solid-state, thin film battery technology is disclosed in Julian, et al., *Solid State Batteries: Materials Design and Optimization*, Kluwer Academic Publishers (Boston, Mass., 1994) which is incorporated herein by this reference.

Commercial lithium batteries are well known in the art. Due to their relatively high energy density, voltage, and charge capacity, these bulk batteries are currently used as power sources for portable electronic devices, such as cameras, wireless phones and laptop computers, and computer motherboard CMOS EPROMs. Commercial lithium batteries typical employ liquid electrolytes which have a low reduction potential and are unstable over a range of voltage cycling, either decomposing or reacting with cell electrodes. In these batteries, porous polymer composite anodes are employed which are fabricated from blends of conductive graphite powder, lithium intercalatable graphite powder, polymer binders, and fugitive liquids which impart porosity to the anode. The porous anode is typically infiltrated with a corrosive liquid electrolyte which reacts with the carbon particulate and forms a solid residue, which is both an electronic and ionic insulator, on the surface of the carbon particles, resulting in an irreversible loss in reversible charge capacity. While the use of carbon particulate in these batteries provides for a very high electrolyte-anode surface area for lithium exchange, the high surface area accelerates reaction with the corrosive electrolyte. These batteries further employ porous polymer composite cathodes fabricated from blends of lithium intercalatable cobalt oxide powders, conductive carbon particulate, polymer binders, and fugitive liquids which impart porosity to the cathode. Since both electrodes require conductive carbon particle-to-particle contact and intimate electrolyte contact with intercalatable carbon and cobalt oxide powders, during repeated cycling, irreversible reaction of the electrolyte with both the anode and cathode particulates cause both passivation of the intercalatable powders and a reduction in particulate size of the conductive powders. This creates a dramatic change in internal cell resistance during repeated cycling, due to loss of both electronic and ionic conductivity, and an irreversible loss in the charge capacity. Thus, the lifetimes in these batteries are typically limited to between 500 to 1000 charge cycles.

More recently, development of thin film, solid-state lithium batteries is being pursued as replacements for current commercial lithium ion batteries for portable power sources in electronic devices and electric vehicles. Solid-state lithium batteries offer distinct advantages over conventional liquid or polymer electrolyte batteries due to the elimination of corrosive electrolyte. Due to the possibility for substantial improvement in reversible charge capacity and battery life as well as significant reduction is cell weight and volume, thin film solid-state lithium batteries are particularly promising for applications in electronic devices, electric vehicles and solid state device power supplies where space and weight are restricted and extended battery life, high energy density and high specific energy are required. A relative comparison of the energy densities and specific energies typically obtained with prior art commercial batteries is provided in FIG. 7. As shown in this figure, the energy densities (1000 Watt-hr/liter) and specific energies (500 Watt-hr/kg) anticipated with thin film lithium battery of the present invention offer substantial improvements over current commercial batteries.

In U.S. Pat. Nos. 5,338,625, 5,512,147, 5,569,520, 5,597,660 and 5,612,152 to Bates, et al., disclose a lithium thin film battery and an electrolyte material for lithium batteries. However, the lithium thin film battery disclosed by Bates, et al., has certain limitations due to the use of lithium metal anodes. U.S. Pat. No. 5,512,387 to Ovshinsky discusses several intrinsic technical and safety limitations of thin film batteries which incorporate lithium metal anodes, this patent being incorporated herein by this reference.

In U.S. Pat. No. 5,338,625, Bates, et al., disclose the use of a lithium phosphorus oxynitride electrolyte, $Li_xPO_yN_z$ where x is approximately 2.8, 2y+3z is approximately 7.8 and z ranges between 0.16 and 0.46, which has been shown to be useful in lithium battery applications due to the relative high ionic conductivity and stability of the electrolyte over the range of lithium half cell voltages. However, the sputtering method employed by Bates, et al., for LiPON electrolyte deposition has fairly low deposition rates and requires long deposition times to obtain acceptable electrolyte film thickness and density. These deposition rates are generally impractical for commercial production of thin film batteries. Furthermore, the use of highly reactive lithium metal anodes by Bates, et al., compromises selection of compatible component materials and restricts the choice of processing methods.

SUMMARY OF THE INVENTION

The present invention provides for an innovative thin film, solid-state, rechargeable electrochemical cell, a thin film, solid-state rechargeable battery comprising a plurality of said cells, and a method for making and repairing the same.

The lithium electrochemical cell of the present invention comprises dense, non porous, inorganic, solid-state, thin film lithiated anodes, lithiated cathodes, and lithium electrolytes, disposed between said anodes and said cathodes, wherein one, or each, of said anodes, cathodes and electrolytes are formed by an innovative ion beam assisted deposition ("IBAD") process.

One object of the present invention is to provide a dense, non porous, inorganic, solid-state, thin film cathode having a high lithium ion mobility, a high voltage relative to lithium metal, a high reversible charge capacity, and a high lithium extraction efficiency which are maintained throughout repetitive charge-discharge cycles.

Another object of the present invention is to provide a dense, non porous, inorganic, solid-state, thin film anode having a high lithium ion mobility, a low voltage relative to lithium metal, a high reversible charge capacity, and a high lithium insertion efficiency which are maintained throughout repetitive charge-discharge cycles.

Another object of the present invention is to provide a dense, non porous, inorganic, solid-state, thin film electrolyte having a high electrochemical stability at high cell voltages, a high ionic conductivity and a low electronic conductivity which are maintained throughout repetitive charge-discharge cycles.

A further object of the present invention is to provide for a dense, non porous, inorganic, solid-state, thin film current collector having a high electronic conductivity, a low ionic conductivity, and a high electrochemical stability which are maintained throughout repetitive charge-discharge cycles.

Yet another object of the present invention is to provide a solid-state, thin film electrochemical cell in which both a thin film anode and a thin film cathode have a preferred crystallographic orientation relative to the electrolyte-electrode interface.

An additional object of the present invention is to provide a solid-state, thin film electrochemical cell whose components have high electrochemical stability at high cell voltages during repetitive charge-discharge cycles.

A further object of the present invention is to provide a low temperature deposition method for making dense, non porous, inorganic, solid-state, thin film battery anodes, cathodes and electrolytes.

Another object of the present invention is to provide a low temperature deposition method for depositing thin film anodes and cathodes with preferred crystallographic orientation relative to an electrolyte-electrode interface.

Yet another object of the present invention is to provide a low temperature deposition method for depositing dense, non porous, inorganic, solid-state, thin film, amorphous or crystalline anodes, cathodes and electrolytes where the degree of crystallinity and grain size of the as-deposited films are controlled without a post-deposition annealing treatment.

A yet further object of the present invention is to provide for a method for the in-situ repairing of defects in a thin film electrolyte positioned within a previously assembled thin film battery.

In a preferred embodiment the electrochemical cell of the present invention may be utilized in a thin film battery comprising a plurality of individual cells connected in series or in parallel. In alternative embodiments, the battery cells may be positioned in a vertically stacked orientation or a horizontal side-by-side orientation. The cells may be incorporated into either rigid substrates or thin, flexible ribbon-like substrate structures and may be adapted to any convenient shape, size or volume.

The thin film cell and battery of the present invention may be utilized in any portable power supply application where a substantial reduction in battery weight or volume is desired while maintaining high reversible charge capacity and discharge rates.

DEFINITIONS

As used herein, the term "thin film" shall refer to individual film layers which are typically less than or equal to two microns in thickness but no greater than ten microns thick. The term "thick film" shall refer to individual film layers which are greater than ten microns and generally 100 um thick or greater. The term "thin film battery" shall refer to solid-state batteries comprised of a plurality of individual electrochemical cells where individual cell thickness, excluding substrate thickness, is typically less than or equal to five microns. Where the terms "instrinsic" or "inherent" are used in the context of solid-state material properties, these terms shall refer to the characteristic properties of the pure, single crystal elements or compounds. The terms "dense" or "high density" shall refer to a density approaching or equal to the intrinsic theoretical density for a pure single crystal of the specific material mentioned. The term "non porous" shall refer to essentially fully dense material having essentially no open or closed porosity. The term "amorphous" shall refer to non-crystalline material. The term "x-ray amorphous" shall refer to a polycrystalline material whose x-ray diffraction pattern exhibits no diffraction peaks. The term "fine grain" shall refer to polycrystalline materials whose mean grain size is less than one micron. The term "energetic ions" shall refer to charged ionic chemical species having a mean kinetic energy distribution between 50 to 100 eV. The term "anisotropic" shall refer to solid materials whose intrinsic single crystal properties are dependent on crystallographic direction. When referring to a method or process, the term "low temperature" shall refer generally to a temperature where either no solid-state transformations or reactions are likely to occur with the specified materials or where any transformations or reactions occur at such a low rate that they are inconsequential. Where the term "high" is used with respect to electrochemical stability, voltage, or decomposition potential, the term shall be relative to the maximum operating cell voltage which may be achieved with specified anode and cathode materials. Where the term "high" is used with respect to material properties, the term shall be relative to the characteristic intrinsic property for the pure, single crystal material. The term "non zero dihedral angle" refers to the angle formed between two non-parallel planes.

BRIEF DESCRIPTION OF THE DRAWINGS

This invention is pointed out with particularity in the appended claims. Other features and benefits of the invention can be more clearly understood with reference to the specification and the accompanying drawings in which:

DESCRIPTION OF THE PREFERRED EMBODIMENTS

1. Electrochemical Cell

Figure 1:
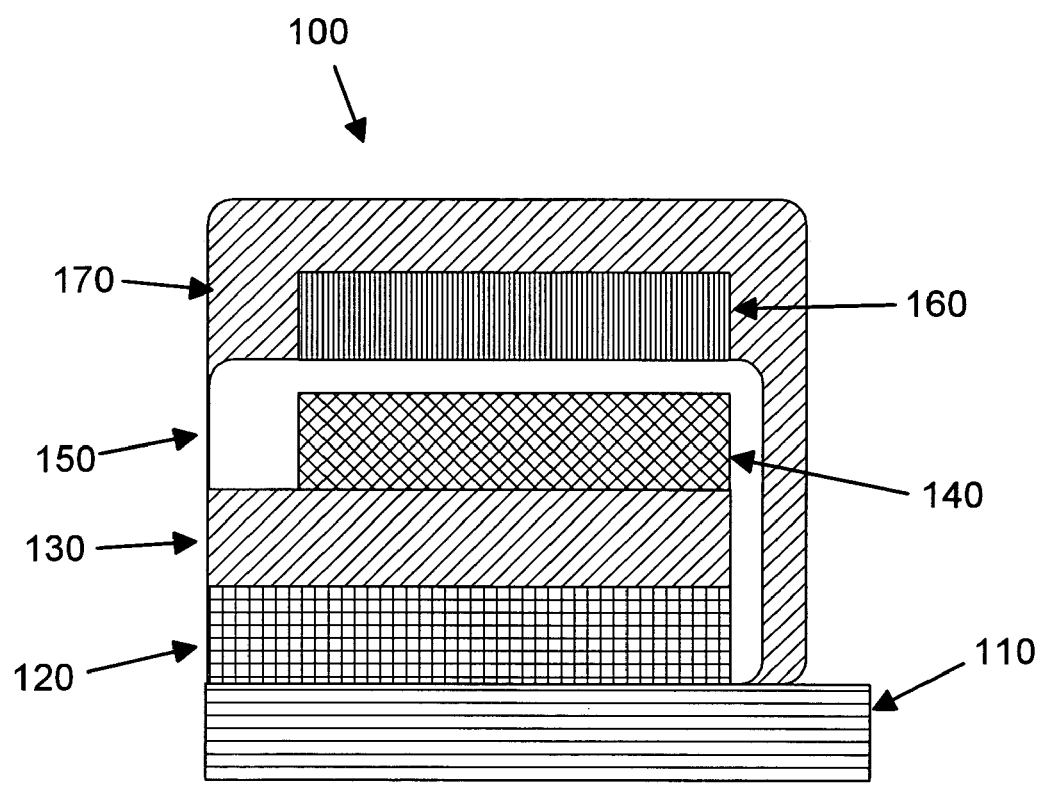
FIG. 1 is a schematic cross-section of the layered thin film structure of the electrochemical cell of the present invention.

In FIG. 1, a schematic cross-sectional view of the electrochemical cell 100 of the present invention is provided. A substrate 110 provides support for the cell 100. An optional intermediate contact layer 120 may be employed for facilitating external electrical contact with the cell 100. Alternatively, the optional contact layer 120 may utilized either for facilitating deposition of a first current collector 130 on the substrate 110, for providing a transition material for reducing any thermal expansion mismatch between the substrate 110 and the first current collector 130, or for preventing any reaction of the substrate 10 with the battery current collector material.

The substrate 110 may be either a metal, ceramic, semiconductor, glass, polymer or a composite material formed from mixtures or laminates of the same. In one preferred embodiment, the substrate 110 is silicon. In another preferred embodiment, the substrate 110 is a thin aluminum or aluminum-copper alloy ribbon. In one embodiment a 1 mm thick aluminum oxide substrate 110 was employed with a 1000 angstrom thick copper intermediate layer 120 used for facilitating external electrical contact with the cell. Alternatively, a first current collector 130 may be directly deposited on the substrate 110. Metals such as aluminum, copper, aluminum-copper alloys, cobalt, nickel, chromium and alloys of such metals are particularly useful as current collectors. Alternatively, vanadium, molybdenum, zirconium, tantalum, niobium and hafnium metals and alloys may be used. In another embodiment, materials having high electronic conductivity, low lithium ion conductivity, and high resistance to oxidation by cathode materials during cell operation may serve as a first current collector 130 and substrate 110 for the cell 100. An electrically conductive material which has a low ionic conductivity and high oxidation resistance to cathode materials is especially preferred in series-stacked cell configurations where it is critical to prevent undesirable lithium ion transport from the cathode of one cell, through a shared current collector, to the anode of an adjacent cell. In stacked-series cell configurations, metal nitrides and mixed metal nitrides such as those of titanium, zirconium, vanadium, tantalum, niobium and hafnium are particularly useful as thin film shared current collectors due to their exceptional low lithium ion conductivity and high oxidation resistance to cathode materials such as $Co^{+4}$ in lithiated cobalt oxide. In a preferred embodiment, thin films of titanium nitride are employed as shared current collectors in series-stacked battery cell configurations.

In a preferred embodiment, a first current collector 130 is deposited on either the intermediate layer 120 or substrate 110. A typical thickness for the current collector layer 130 ranges between 1000 and 1250 angstroms. The current collector 130 is preferably a material having high electronic conductivity, low ionic conductivity, and high electrochemical stability, being resistant to oxidation by the cell cathode during cell operation.

One skilled in the art may readily determine the relative oxidation resistance characteristics of candidate current collector materials versus candidate cathode materials by consulting well known reference handbooks listing either the electrochemical series of standard reduction/oxidation potentials (e.g. *Handbook of Chemistry and Physics*, 77$^{th}$ ed., CRC Press (Boca Raton, Fla., 1996)) or the thermodynamic properties of elements and their compounds (e.g. *JANAF Thermochemical Tables*, 4$^{th}$ ed., Am. Chemical Soc. (Washington, D.C., 1998) with supplements). A skilled artisan may evaluate and rank the relative oxidation resistance of suitable candidate current collector materials based on published half cell redox potentials and relative ranking of half cell potentials of current collector and cathode constituents when considering thermodynamically preferred oxidations states. For example, a candidate current collector material would be considered to have a high oxidation resistance to a lithium cobalt oxide cathode if, in a fully discharged cell, oxidation of the current collector $Co^{+4}$ and reduction of cobalt to $Co^{+3}$ is not thermodynamically favored based on the relative reaction potential or free energy for the overall redox reaction. Generally, metals and alloys of metals such as aluminum, copper, nickel, molybdenum, chromium, zirconium, vanadium, tantalum, niobium, and hafnium exhibit high electronic conductivity, low lithium ion conductivity and moderate oxidation resistance to cathode candidate materials. While these metals may be employed as current collectors 130, since some of these metals may be less resistant to oxidation by specific cathode materials, in high cell discharge states, oxidation of metallic current collectors may result in the formation of metal oxides which typically exhibit high ion conductivity.

Where high oxidation resistance to cathode materials is required, such as in stacked-series cell configurations, metal nitrides and mixed metal nitrides are typically preferred due to their relatively high oxidation resistance. Metal nitrides such as those of titanium, zirconium, vanadium, tantalum, niobium and hafnium may also be used. In the most preferred embodiment, titanium nitride is utilized as the current collector 130 due to its high oxidation resistance to cathode materials such as lithium cobalt oxide in high cell discharge states.

A 0.12 µm to 1.5 µm thick anode layer 140 is deposited on the first current collector 130. The anode 140 is typically formed from a reversible ion insertion material which electrochemically adsorbs and desorbs ions such as lithium during discharging and charging of the cell 100. In a preferred embodiment, the anode 140 is formed from a reversible lithium insertion material, for example, graphite. Preferably, the anode layer 140 is formed from a material having a reversible high charge capacity, a low half cell voltage relative to lithium metal, and a high ion mobility.

The charge capacity of the anode 140 is determined by measuring the amount of lithium that can be reversibly inserted into the material during battery discharge cycles. The anode half cell voltage is determined from measuring the combined cell voltage from the cathode and anode half cell reactions and subtracting the lithium half cell voltage. The ion mobility may be determined by measurement of the ion diffusion coefficient in candidate anode materials according to known methods in the art. For example, a particularly useful transient electrical method for measurement of ion diffusion coefficients in thin film electrodes is disclosed in Goldner, et at, *J Electrochem. Soc.* 143(6): L129–L130 (1996).

Materials which have been shown to be particularly useful as anode materials include carbon, tin oxide, indium oxide, indium tin oxide and amorphous tin oxide glasses. In a preferred embodiment, a thin film carbon anode 140 is utilized. In a most preferred embodiment thin film of graphite is employed as an anode 140.

In a preferred embodiment, thin films of polycrystalline graphite are used as anodes 140. Generally, polycrystalline graphite films having a fine grain size are preferred. In one embodiment, median graphite grain sizes are less than 1000 angstroms. In a preferred embodiment, median graphite grain sizes are less than 100 angstroms. In a most preferred embodiment, median grain size of less than 10 angstroms and are x-ray amorphous.

In an alternative embodiment, thin film graphite anodes formed from graphene sheets are preferred. Calculations for planar carbon molecules have shown that higher charge capacities and reduced half cell voltages may be obtained with carbon films which are deposited in graphene layers having average diameters of less than 10 angstroms [see Gerouki, et al, *J. Electrochem. Soc.* 143(11):L262–L263 (1996)]. In an alternative preferred embodiment, a thin film carbon anode 140 is deposited by a method which will yield primarily single graphene sheets with a diameter of less than ten angstroms.

In one embodiment, a 1200 to 1400 angstrom thick carbon anode 140 is formed by thermally evaporating graphite by DC arc evaporation. With this deposition method, the resultant film structure has a typical graphitic carbon crystallite or unit cell c-axis orientation which is perpendicular to the substrate plane. With this embodiment, electrical measurements of cell charge-discharge cycles with DC arc evaporated films have shown that one mole of lithium is inserted for every four moles of carbon. As shown in Table I, the charge capacity for this anode film is calculated by extrapolation as 588 milliamp hours per gram. Measurements of lithium ion diffusion coefficients for these films yielded a lithium diffusivity of approximately $5 \times 10^{-10}$ cm$^2$/s. This is lower than a typical lithium diffusivity in graphite of $8 \times 10^{-7}$ cm$^2$/s and is most likely due to the anisotropy of the graphite crystal lattice and a non optimum crystallographic orientation of the graphite c-axis, which has the slowest lithium diffusion pathway, in a direction perpendicular to the substrate.

In a preferred embodiment, the thin film carbon anode 140 is deposited using an ion beam assisted, thermal evaporation deposition process. In this embodiment, due to the creation of a finer carbon structure, lithium insertion levels may be obtained that are as high as one mole of lithium per two moles of carbon. As shown by Table I, the charge capacity for an anode formed by this embodiment may be as high as 1116 milliamp hours per gram.

TABLE I

| Charge Capacities for Li$_y$C$_6$ | | | | | |
|---|---|---|---|---|---|
| $M \cong 72 \frac{g}{mole}$ | | $\rho_{bulk} \approx 2.25 \frac{g}{cm^3}$ | | $\rho_{film} \approx 1.5 \frac{g}{cm^3}$ | |
| y | $\frac{mAh}{g}$ | $\frac{mAh}{cm^3}$ | $\frac{mC}{cm^2 \cdot \mu m}$ | $\frac{mAh}{cm^3}$ | $\frac{mC}{cm^2 \cdot \mu m}$ |
| 1 | 372 | 837 | 301 | 558 | 201 |
| 2 | 744 | 1674 | 602 | 1116 | 402 |
| 3 | 1116 | 2511 | 903 | 1674 | 603 |

TABLE II

Charge Capacities for $Li_{1-x}CoO_2$ $M \cong 98 \frac{g}{mole}$     $\rho_{bulk} \approx 5 \frac{g}{cm^3}$     $\rho_{film} \approx 3.7 \frac{g}{cm^3}$

| x | $\frac{mAh}{g}$ | $\frac{mAh}{cm^3}$ | $\frac{mC}{cm^2 \cdot \mu m}$ | $\frac{mAh}{cm^3}$ | $\frac{mC}{cm^2 \cdot \mu m}$ |
|---|---|---|---|---|---|
| 0.5 | 137 | 685 | 246 | 507 | 182 |
| 0.8 | 219 | 1096 | 394 | 811 | 291 |
| 0.85 | 233 | 1165 | 419 | 862 | 310 |
| 0.9 | 246 | 1233 | 442 | 913 | 328 |

An additional advantage of this particular embodiment is in providing a dense, non porous, fine grain, graphite deposit with controlled crystallographic orientation, crystallinity and grain size. This method provides for creation of either a preferred crystallographic orientation, or alternatively, a random orientation within the graphite film where the graphite c-planes, which provide the fasted lithium diffusion path in graphite, form a predominantly non zero dihedral angle with the anode-electrolyte interface. In this embodiment, due to the increased frequency of a parallel orientation of the graphite c-axis relative to the substrate, a substantial improvement in lithium transport is anticipated where the lithium diffusivity in a direction perpendicular to the anode-electrolyte interface may be significantly increased by at least an order of magnitude, or higher, to a minimum of $5 \times 10^{-9}$ cm$^2$/s. Alternatively, by depositing randomly oriented polycrystalline graphite films with increasingly finer grain size, it is anticipated that lithium ion diffusivity may be significantly increased due to enhanced ion transport and diffusion created by increased stacking faults or increased grain boundary diffusion. Thus, in a preferred embodiment, lithium diffusivity in the anode is $5 \times 10^{-8}$ cm$^2$/s. In a most preferred embodiment, lithium diffusivity in the anode is $8 \times 10^{-7}$ cm$^2$/s.

A 0.8 $\mu$m to 2.25 $\mu$m thick electrolyte layer 150 is deposited on the anode 140 by means of an innovative ion-assisted thermal evaporation process which is described below. The electrolyte material preferably has a high density, a high ionic conductivity, a low electronic conductivity, a high decomposition potential which is higher than the characteristic cell operating voltage, and a high decomposition or breakdown electric field.

While any electrolyte material having these characteristics would be suitable, lithium phosphorus oxynitride, lithium niobate, lithium aluminum silicate, lithium aluminum germanium phosphate [$Li_{1.5}Al_{0.5}Ge_{1.5}(PO_4)_3$] and lithium silicon nitride have been shown to be particularly useful. In a preferred embodiment, the ionic conductivity of the electrolyte is at least $5 \times 10^{-7}$ S/cm, the decomposition voltage is at least 6.0 volts, and the decomposition or breakdown electric field is 6.7 V/$\mu$m, as conventionally measured by current instability and decay over a range of applied voltages. In a most preferred embodiment, the ionic conductivity of the electrolyte is at least $1 \times 10^{-6}$ S/cm, the electrolyte decomposition voltage is at least 10.0 volts, and the decomposition or breakdown electric field is 10.0 V/$\mu$m.

In a preferred embodiment, a lithium phosphorus oxynitride (LiPON) thin film electrolyte is deposited by the ion-assisted thermal evaporation process of the present invention. From experimental observations and micrographs of typical electrolyte deposit morphologies and microstructures obtained with conventional sputter deposited films and ion-assisted thermal evaporation deposited films, the lower porosity of the ion-assisted deposited films typically provides a higher electrolyte decomposition or breakdown voltage than conventionally sputtered films which exhibit a higher porosity and lower decomposition or breakdown voltage.

Ionic conductivity measurements of as-deposited lithium phosphorus oxynitride electrolyte are made with aluminum electrodes using an Al/LiPON/Al configuration. Ionic conductivity is calculated from impedance data measured at 5 mV between 10 Hz and $10^5$ Hz using an M263 Potentiostat/Galvanostat and a 5210 Lock-in Amplifier (Keithley Instruments, Cleveland, Ohio).

Comparative density measurements were obtained on films produced by the method of the current invention and films produced by conventional sputtering methods. By combining conventional measurements of film areal density made with an IC6000 quartz crystal oscillator (Inficon, East Syracuse, N.Y.) with film thickness measurements made with a Surfanalyzer 150 profilometer (Federal Products Corp., Providence, R.I.), film densities were measured on samples of as-deposited electrolyte films. As-deposited electrolyte film densities obtained with the deposition method of the present invention have densities ranging from 2.4 g/cm$^3$ to 2.5 g/cm$^3$, equivalent to the 2.5 g/cm$^3$ theoretical density for lithium phosphorus oxynitride. By comparison, measured densities of LiPON films made by more traditional sputtering methods range between 1.6 and 1.8 g/cm$^3$ and are significantly lower than the theoretical LiPON density.

Typically, a 0.39 $\mu$m to 1.25 $\mu$m thick cathode film 160 is deposited on the electrolyte layer 150. Preferred cathode materials have an intrinsically high, reversible lithium extraction efficiency after repetitive battery charge-discharge cycles. The lithium extraction efficiency is measured by combining coulomb counting measurements, during cell charging at a fixed current for a fixed time, with cathode film density measurements. The extraction efficiency (y %) is reported as the total charge count ($\Delta Q = I \times t$), which is due to lithium adsorption/reduction by the cathode material, divided by the moles of cathode material [$M_{Cathode}$], or $$y_{\%} = 100 \times (\Delta Q / ((1.6 \times 10^{-19} \, q/e^-) \times [M_{Cathode}]))$$

where,

[$M_{Cathode}$] = (Cathode Volume × Cathode Density × $N_A$)/(Cathode M. W.)

and $N_A$ is Avogadro's Number, M. W. is the molecular weight of the cathode material, and cathode film volume and film density measurements are made with an Inficon IC6000 quartz crystal oscillator and a Surfanalyzer 150 profilometer as discussed previously.

Lithiated metal oxides and lithiated mixed oxides of cobalt, nickel, chromium and vanadium, tin oxide, indium oxide, indium tin oxide and tin oxide amorphous glasses have been shown to be particularly useful as lithium insertion materials used as cathodes. In one embodiment, a sputtered thin film of lithium cobalt oxide is utilized as the cathode 160. In a preferred embodiment, an ion beam assisted deposited film of lithium cobalt oxide is employed as a cathode 160.

In a preferred embodiment, thin films of polycrystalline $LiCoO_2$ are used as cathodes 160. Generally, polycrystalline films having a fine grain size are preferred. In a most preferred embodiment, dense, fine grain, polycrystalline $LiCoO_2$ having a preferred crystallographic orientation is deposited by the ion beam assisted deposition method of the present invention. In this embodiment, the (003) LiCoO$_2$ lattice planes are oriented in a non-parallel angle to the cathode-electrolyte interface such that the (003) planes are aligned with a non-zero dihedral angle with the interface. The preferred orientation produced by this method provides for optimum lithium transport in a direction orthogonal to the cathode-electrolyte interface. Lithium ion diffusion measurements with films produced by this method indicate the ion diffusivity to be at least $10^{-8}$ cm$^2$/s. LiCoO$_2$ films deposited by this method exhibit a preferred crystallographic orientation where the (101) and (104) lattice planes are parallel to the electrolyte interface and the (003) plane is non-parallel, thus providing a preferred orientation for lithium ion transport through the thin film cell.

An additional advantage of this preferred deposition method is in providing a low temperature deposition method for depositing thin films of LiCoO$_2$ which exhibit the same electrochemical properties as high temperature LiCoO$_2$. It is known in the art that high temperature LiCoO$_2$ is preferred to low temperature LiCoO$_2$ as a cathode material (see R. J. Gummow, et al., *Solid State Ionics* 53–56: 681–687 (1992); E. Rossen, et al., *Solid State Ionics* 62:53–60 (1993); each of which are incorporated herein by this reference).

In a preferred embodiment, the cathode 160 exhibits a reversible lithium extraction efficiency ($y_\%$) of at least eighty percent after at least 400 battery recharging cycles. In this embodiment, as shown in Table II for x=0.8, the charge capacity of the Li$_{1-x}$CoO$_2$ is 219 milliamp hours per gram. In comparing the charge capacities for a carbon anode of the present invention, as shown in Table I, and the charge capacities of a lithium cobalt oxide cathode of the present invention, as shown in Table II, the relative weights or film thicknesses of the anode and cathode layers may be adjusted to balance the overall charge capacity of the battery. In the most preferred embodiment, the cathode 160 exhibits an eighty percent extraction efficiency after 20,000 cycles.

Typically, a 1000 to 4000 angstrom thick film of a second current collector 170 is deposited on the cathode layer 160. Thicker coatings may be preferred when using stacked cell configurations when the current collector serves the cathode of one cell and the anode of another cell. The material requirements of the second current collector 170 are essentially the same as the requirements specified above for the first current collector 130. In the most preferred embodiment, titanium nitride has been shown to be particularly useful as a second current collector 170.

The cell 100 may be encapsulated with an organic or inorganic packaging material to prevent degradation of cell components or cell operation from exposure to atmospheric moisture or oxygen. In addition, use of a packaging material may provide protection of cell components from mechanical or thermal stress originating from the surrounding environment. A commercially available high vacuum, epoxy resin, Torr-Seal® (Varian, Lexington, Mass.), has been shown to be particularly useful in preventing contact of cell components with atmospheric moisture and oxygen. In another embodiment, thin metal foils of aluminum or nickel, ranging for 0.25 to 1.0 mil thickness, may be utilized as a packaging material. In addition, any other suitable packaging materials may be utilized which create barriers to water vapor and oxygen exposure. For example, a variety of films, coatings or foils of metals, ceramics, glasses, polymers which can be applied as an impervious overlay barrier, without disrupting cell components, would be particularly useful.

Figure 2:
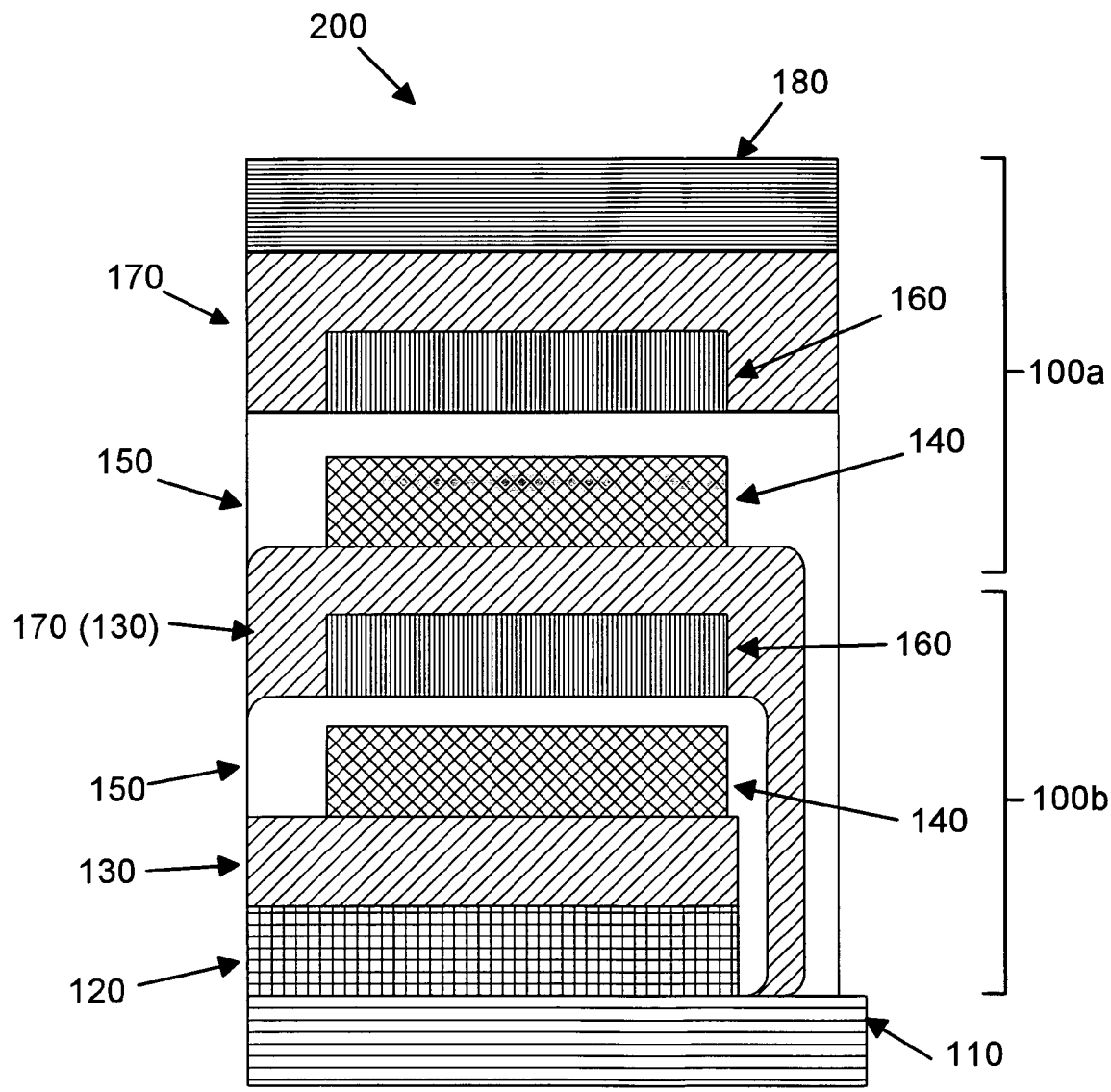
FIG. 2 is a schematic cross-section of a stackable battery of the present invention comprising two cells connected in series.

In FIG. 2, a multicell battery 200 of the present invention is depicted containing two stacked electrochemical cells 100a, 100b of the present invention. An additional feature shown in FIG. 2, is the application of an optional thin aluminum film 180 which is applied for facilitating external electrical contact with the cell. Where only internal battery contacts are required, this layer can be eliminated. Other preferred embodiments of the present invention include a large number of vertically stacked cells or horizontal arrangements of individual cells or groups of vertically stacked cells, connected in either a series, parallel or series-parallel relationship so as to provide any desired voltage and discharge current capacity for a particular cell configuration.

While FIG. 2 shows a series relationship between the two stacked cells 100a, 100b, a parallel configuration may also be envisioned. In the series configuration shown in FIG. 2, the first current collector 170 of the bottom cell 100a also serves as the second current collector 130 of the top cell 100b.

Figure 3:
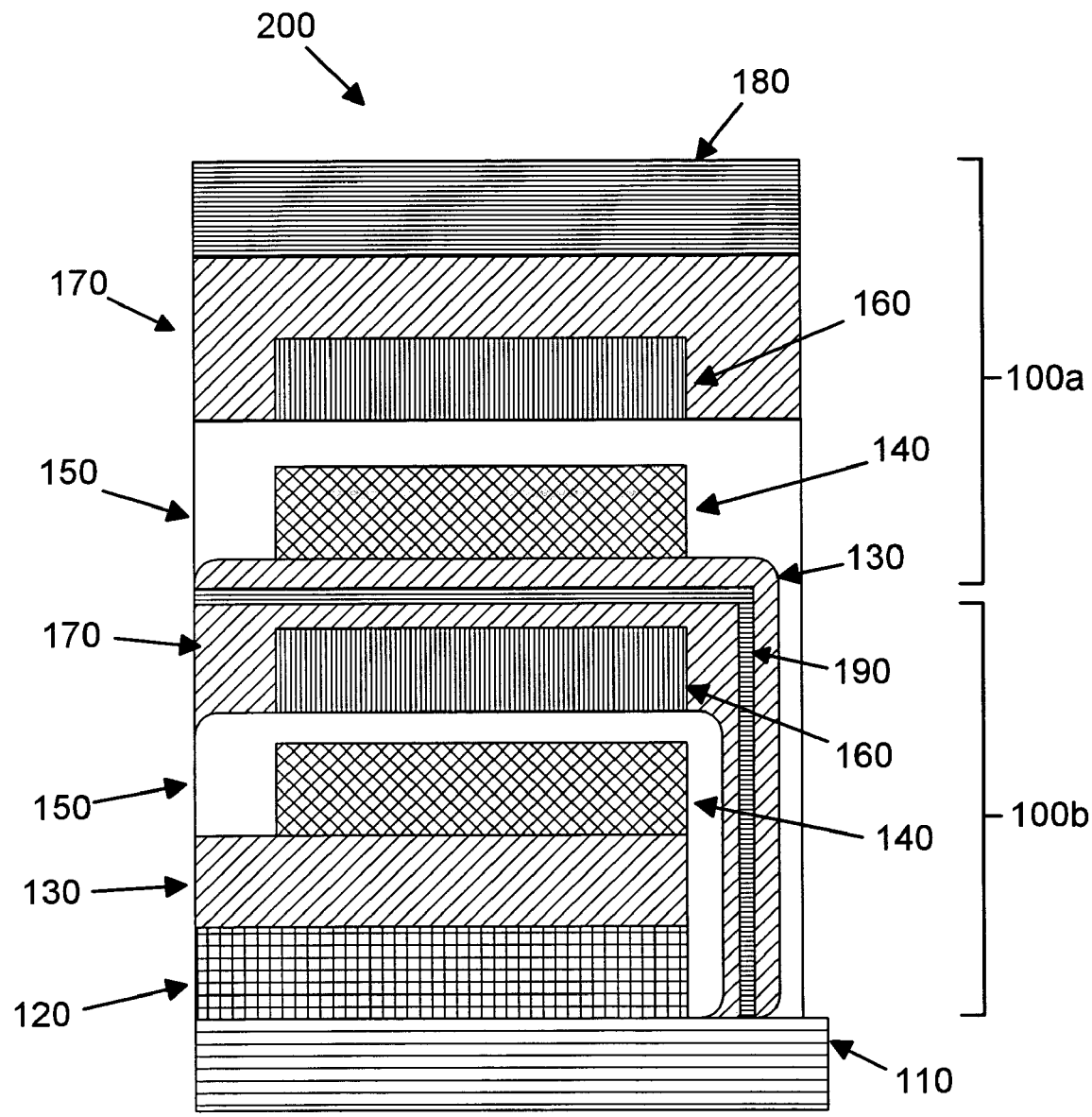
FIG. 3 is a schematic cross-section of a stackable battery of the present invention comprising two cells connected in parallel.

In an alternative embodiment, as shown in FIG. 3, a parallel configuration of stacked cells 100a, 100b is possible if necessary for a particular battery application. With this embodiment, an additional insulating layer 190 is deposited on the first current collector 170 of the bottom cell 100a and a second current collector layer 130 is deposited on the insulating layer 190 for the top cell 100b. In one embodiment, a thin alumina film is deposited as an insulating layer 190. The cells are then connected in parallel by electrically connecting the first current collectors 170 of each cell and by electrically connecting the second current collectors 130 of each cell. Such connections can be easily made by conventional modifications to the deposition masks utilized in the cell fabrication process described herein.

Figure 8:
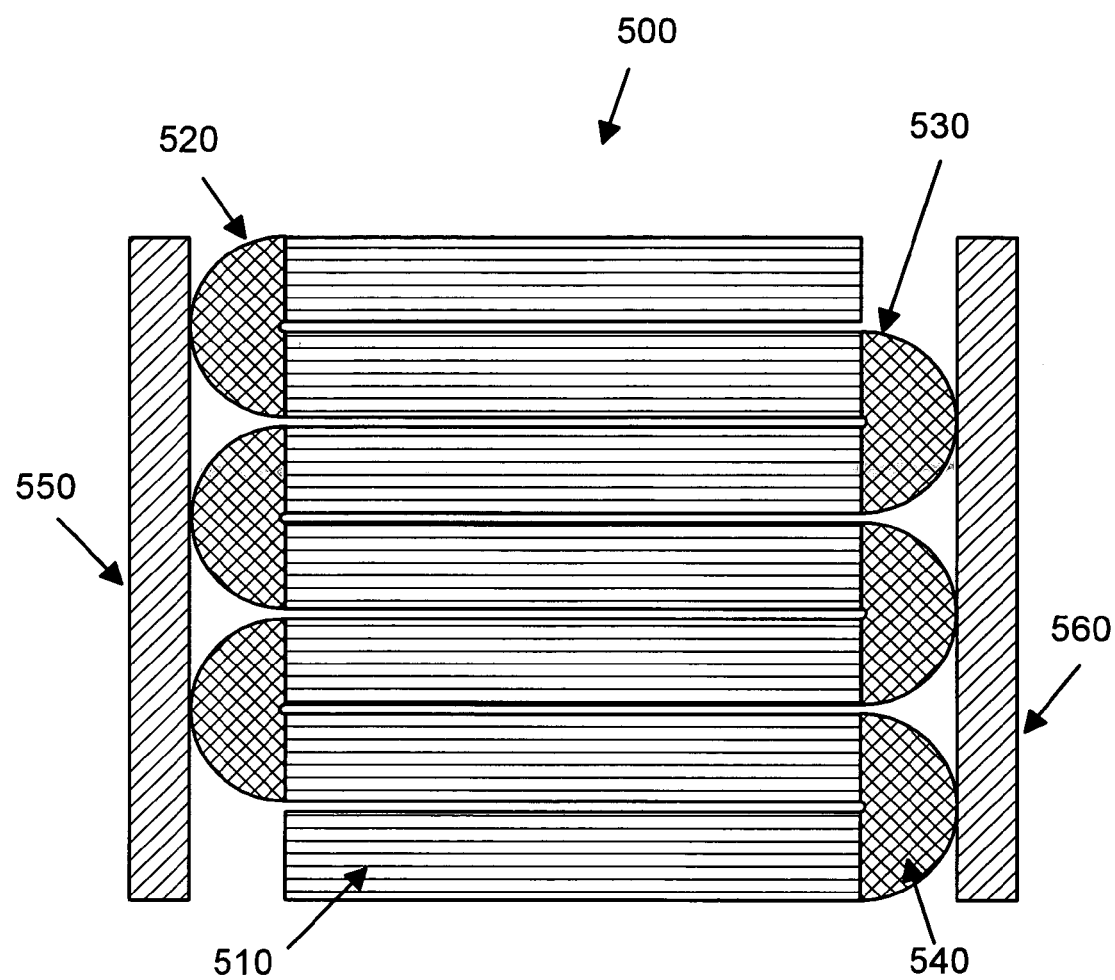
FIG. 8 is a schematic of an innovative folded configuration provided by the battery of the present invention.

In FIG. 8, an innovative configuration provided by the battery of the present invention is illustrated. This embodiment enables use of a flexible, folded or serpentine cell configuration 500 which provides for a plurality of multi-cell series stacks 510 to be connected in parallel by means of a first flexible current collector 520 and a second flexible current collector 530, both current collectors 520, 530 being commonly shared by the plurality of cell stacks. An electrically insulating packing material 540 is positioned between the cell stacks 510 to maintain separation of the first 520 and second 530 current collectors so as to avoid electrical contact upon bending said current collectors. The first flexible current collector 520 is positioned so as to provide a plurality of electrical contacts with a first battery terminal 550 at predetermined locations along said first current collector's 520 length. The second flexible current collector 530 is positioned so as to provide a plurality of electrical contacts with a second battery terminal 560 at predetermined locations along said second current collector's 530 length. The number of cells in each multi-cell stack 510 and the spacing of said first and second current collector 520, 530 electrical contacts with said first and second battery terminals 550, 560 may be conveniently configured so as to provide any useful battery voltage and current capacity.

Electrical contact between the current collectors 520, 530 and battery terminals 550, 560 may be provided by any suitable means. In one embodiment, the current collectors 520, 530 may be brazed, soldered, or spot welded to the battery terminals 550, 560. In an alternative embodiment, the current collectors 520, 530 may be clamped to the battery terminals 550, 560. In another embodiment, electrical contact between the current collectors 520, 530 and battery terminals 550, 560 is made by a suitable contacting means, such as a spring-loaded battery terminal mount, which urges the current collectors 520, 530 against the battery terminals 550, 560.

The first and second battery terminals 550, 560 are typically comprised of any suitable electrically conducting material. In one embodiment, copper or aluminum buss bars of conventional design may be utilized. In another embodiment, copper or aluminum foil, wire or cable are used. The preferred cross-sectional dimension of the terminals 550, 560 is determined by the battery 500 current and voltage capacity established for any given multi-cell 510 configuration.

In a preferred embodiment, the first and second flexible current collectors 520, 530 are comprised of electrically conductive thin metal foil having a thickness ranging between 0.25 and 1.0 mil. Alternatively, the current collectors 520, 530 may be comprised of electrically conductive wire or cable. The multi-cell stacks 510 may be directly deposited on a surface of a foil current collector or, alternatively, pre-assembled multi-cell stacks may be brazed, soldered or spot welded to foil, wire or cable current collectors. While any suitable electrical conductor may by utilized as a current collector, in a preferred embodiment, nickel or aluminum foil is used.

Any suitable electrical insulation may be used as packing material 540, including sheet materials, fabrics, fiber wool, fiber blankets, individual fibers, or powders made from a plastic, ceramic or glass insulator material. Alternatively, a non-polar insulating organic liquid may be used. In a preferred embodiment, fiberglass blanket is used as packing material 540.

The innovation of this particular embodiment, is in substantially reducing the known problem with spreading resistance, or IR drop, in a large area battery. Since each cell in the battery is located proximate to a battery terminal, the overall internal resistance of a large area, multi-cell battery is significantly reduced. A further advantage of this battery embodiment is in accommodating a variety of unusual shapes and volumes for efficient and compact placement of a battery in a confined space.

Defective regions of a thin film cell electrolyte of the present invention may be repaired in-situ by applying a high voltage pulse across the cell anode and a cathode which is sufficient to resistively heat the defective region and melt a portion of the electrolyte in the localized defective region. The defect is thereby repaired by filling the defective region with the melted electrolyte which subsequently solidifies and replaces the originally defective region.

2. Cell and Battery Fabrication

The preferred method for depositing thin film anodes, cathodes and electrolytes and fabricating thin film cells and batteries utilizes the innovative ion beam assisted deposition method disclosed herein. This method provides for control of thin film crystallinity, crystallographic orientation and grain size as well as film composition and density. Additionally, the ion beam assisted deposition method of the present invention provides for control and adjustment of beam energy, beam vector momentum and ion flux density. With this method, ion beam energy is adjusted by varying anode voltage, vector momentum of the ion beam is adjusted by changing the beam angle relative to the substrate and ion flux density is increased by increasing the beam anode current.

The method of the present invention further provides for adjusting the flux ratio of evaporant species and ions at relatively low beam energies of less than 100 eV. The independent control of evaporant/ion flux ratios and ion beam energy that the present method provides uniquely enables independent control of deposit crystallinity, orientation, grain size, composition and density. Thus, as-deposited thin film structures may be produced by the method of the present invention which cannot be achieved by conventional thin film deposition methods, such as thermal evaporation and sputtering, without subsequent post-deposition treatments. While evaporant/ion flux ratios may be adjusted to suit a particular material deposition, in the preferred embodiment, the ion/evaporant flux ration is adjusted to at least 1.0 or greater to achieve advantageous results from the ion beam treatment.

In one example embodiment, a thin film battery, such as the two cell battery shown FIG. 2, is produced by a series of depositions steps involving eleven film layers. In this example, a first (bottom) cell is produced by depositing layer of thermally evaporated copper on an aluminum oxide substrate, followed by a second layer of rf magnetron sputter coated tinanium nitride anode current collector, a third layer of an e-beam evaporated graphite anode, a forth layer of ion-beam assisted-thermally evaporated LiPON electrolyte, a fifth layer of rf magnetron sputtered $LiCoO_2$ cathode, and a sixth layer of rf magnetron sputtered titanium nitride cathode current collector. This titanium nitride layer also serves as the anode current collector for a second (top) cell. The second (top) cell is deposited on top of the first (bottom) cell by depositing a seventh layer of an e-beam evaporated graphite as an anode, an eighth layer of ion-beam assisted-thermally evaporated LiPON electrolyte, a ninth layer of rf magnetron sputtered $LiCoO_2$ cathode, a tenth layer of rf magnetron sputtered titanium nitride cathode current collector and an eleventh layer of a thermally evaporated aluminum overcoat. While a method for producing a two cell battery, comprising eleven deposition layers, is described above, the battery of the present invention, and method of making the same, are not intended to be necessarily limited to any one configuration. Other cell and battery configurations, having fewer or greater number of layers, are also envisioned and may be constructed by applying the methods taught herein.

In a first film layer, a nominally 1000 Å thick contact layer 120 is deposited on a nominally 0.1 mm thick substrate 110 comprised of a ceramic, glass, metal, semiconductor or polymer material. The contact 120 may deposited using any suitable conductor material and any suitable evaporation or sputtering deposition method. In a preferred embodiment, a copper film is deposited with a Model KDTG-3P vacuum thermal evaporation system (Kinney, Boston, Mass.), at a deposition rate of 2000 angstroms per second. A conventional aluminum contact mask, nominally 1 mm thick, with five 1 cm×1 cm cutouts with tab extensions, was used for depositing the contact layer.

In a second film layer, a nominally 1000 Å thick first current collector film 130 is deposited over the contact layer 120 using the contact mask. The contact mask is positioned over the substrate 110 by means of substrate register pins and mask alignment holes for reproducible alignment of masks during successive deposition steps. In a preferred embodiment, a titanium nitride current collector 130 is deposited over the contact 120 using an rf-magnetron sputtering system (Consolidated Vacuum Corp., Rochester, N.Y.). A two inch diameter TiN target is pre-sputtered in nitrogen at 8 millitorr chamber pressure and 200 watts and subsequently deposited at a rate of approximately 3 Å per second in argon at 2 millitorr pressure and 200 watts.

In a third film layer, a nominally 1400 Å thick anode film 140 is deposited over the current collector 130 using a conventional aluminum electrode mask, nominally 1 mm thick, with five 1 cm×1 cm cutouts. The electrode mask is positioned over the substrate 110 by means of substrate register pins and mask alignment holes for reproducible alignment of masks during successive deposition steps.

In one preferred embodiment, a carbon anode film 140 is deposited by a thermal evaporation vacuum e-beam system, an EB/Model 5/10 (Sloan, Cleveland, Ohio) equipped with a K. H. Frederic VC-3 pump control. Chamber pressure is monitored with a Granville-Philips Series 260 ion gauge controller and Series 275 Convectron gauge. Films are typically deposited at a rate of 4 Å per second. Typical carbon film densities produced by this embodiment are 1.5 g/cm$^3$.

Figure 4:
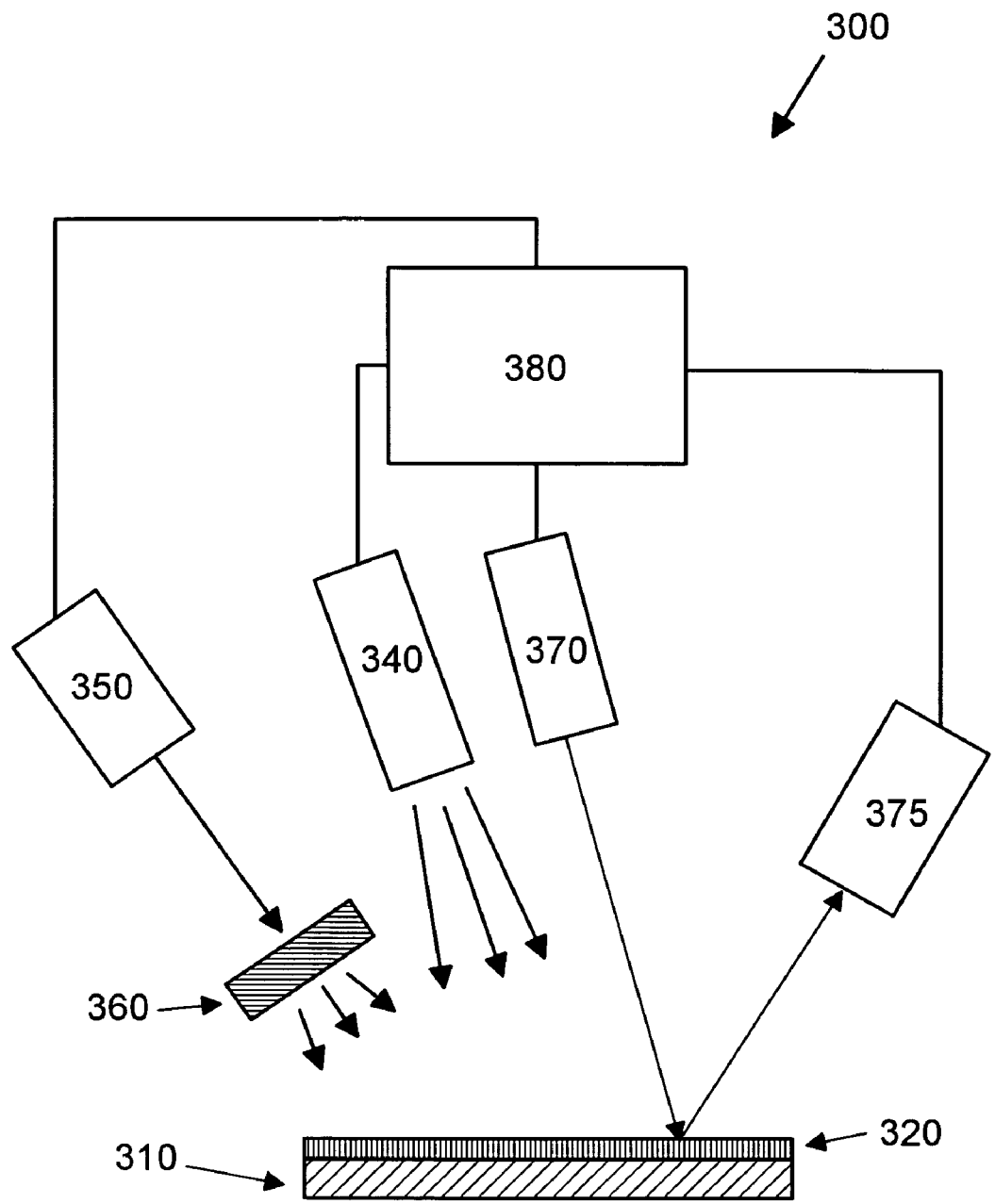
FIG. 4 is a schematic diagram of the coating apparatus utilized for depositing the electrolyte of the present invention.

In the most preferred embodiment, a graphitic carbon anode film 140 is deposited from a high purity graphite source (Poco Graphite, Decatur, Tex.) using an ion-assisted e-beam thermal evaporation method and system, similar to the method used for electrolyte films described herein. In this embodiment, the deposition system 300 shown in FIG. 4 is utilized. For typical e-beam evaporation runs, a gun voltage of 9.5 kV and beam current of 100 mA are employed. An argon ion gun 340 comprising a Mark I controller 390 with a Gridless Ion Source (Commonwealth Scientific Corp., Alexandria, Va.) is utilized together with an Model 8960 e-beam thermal evaporator gun 350 (IVI Corp., Pembroke, Mass.) and power supply controller 395. The inherent design and operating characteristics for the Commonwealth ion gun 340 provide for an ion beam energy, in electron volts (eV), of approximately 60% of the anode voltage for the singly charged ions used in the present method. This relationship between beam energy and anode voltage is obtained from ion beam calibration plots provided by the manufacturer. Ion beam current for this gun is typically 15–25% of the anode current (see "Guide to Operators for the Mark I Gridless Ion Source and Controller", Commonwealth Scientific Corp., Alexandria, Va. (March 1990) which is incorporated herein by this reference).

In one embodiment, the ion beam 340 anode voltage is set at 163 volts, anode current is set at 0.33 amps, and cathode current is 16.4 amps. In this embodiment, the substrate 310 is pre-sputtered with the argon ion gun 340 beam. The ion gun 340 is then shut off as the source target 360 is heated by the e-beam evaporator gun 350. Once the source target 360 evaporation commences and deposits start to form on the substrate 310, the ion gun 340 is again switched on deposition proceeds until the desired anode film thickness is achieved. In this embodiment, anode film 140 deposition rates of at least 25 Å per second are obtained with carbon films 140. Typical carbon film 140 densities produced by this embodiment are 1.9 g/cm$^3$. In a preferred embodiment, the anode current is set at approximately 1 amp and the anode voltage is set between 140–160 volts. In this preferred embodiment, graphite film densities of 2.1 g/cm$^3$ and as high as 2.25 g/cm$^3$ are obtained. In graphite films produced by this preferred embodiment, lithium ion diffusivities were measured as $1^{-8}$ cm$^2$/s.

In a fourth film layer, a nominally 2.2 μm thick electrolyte film 150 is deposited over the anode film 140 using a nominally 1 mm thick elongated alumina mask 230, having a nominal 0.5 cm width. This mask has no register pins and is typically used in a mobile manner, manually positioning the mask over selected areas of the substrate 110 for deposition of the fourth, sixth, and eighth film layers which are described herein. In the fourth film layer, the mask is positioned parallel to and aligned with the top edge of the substrate 110.

In the most preferred embodiment, a lithium phosphorus oxynitride electrolyte film 140 is deposited from a lithium orthophosphate source target 360 (Johnson Matthey, Ward Hill, Mass.), comprised of a pressed powder Li$_3$PO$_4$ pellet, using an ion-assisted e-beam or resistively heated boat thermal evaporation method. The deposition system 300 utilized in this embodiment is shown schematically in FIG. 4.

With reference to FIG. 4, the deposition system 300 comprises an ion beam gun 340 which bombards a substrate 310 with energetic ions, an e-beam gun 350 which heats a source target 360 and thermally evaporates vapor for condensation on the substrate 310 in forming a film deposit 320. The film thickness is optically monitored by an optical light source 370 and optical detector 375, which detector 375 is in electrical communication with a feedback controller 380. The feedback controller 380 uses signals sent by the detector 375 for controlling the ion beam flux 340, by adjusting the ion gun power supply controller 390, and the e-beam flux 350, by adjusting the e-beam power supply controller 395.

A nitrogen ion gun 340 comprising a Mark I controller 390 with a Gridless Ion Source (Commonwealth Scientific Corp., Alexandria, Va.) is utilized together with a Model 8960 e-beam thermal evaporator gun 350 (IVI Corp., Pembroke, Mass.) and power supply controller 395. As mentioned previously, the inherent design and operating characteristics for the Commonwealth ion gun 340 provide for an ion beam energy of approximately 60% of the anode voltage. For a typical deposition run, the ion beam 340 nitrogen flow is adjusted to 9.6 scfm, anode voltage is set between 100 to 150 volts, anode current is set at approximately 0.98 amps, and cathode current is nominally 14 amps. Film 320 thickness is measured with an Inficon® IC 6000 Process Controller (Leybold-Heraeus Inc., Syracuse, N.Y.) 370, 375.

In a typical deposition run, the substrate 310 is pre-sputtered with the nitrogen ion gun 340 beam. The ion gun 340 is then shut off as the source target 360 is heated by the e-beam gun 350. Once the source target 360 evaporation vapors begin to deposit on the substrate 310, the ion gun 340 is again switched on deposition proceeds until the desired film thickness is achieved. Typically, electrolyte film 140 deposition rates of at least 25 Å per second are obtained. Typical Li$_x$PO$_y$N$_z$ film 150 densities produced by this preferred embodiment are 2.4 g/cm$^3$.

In a fifth film layer, a nominally 3900 Å thick cathode film 160 is deposited over the electrolyte film 150 using the electrode mask. In a preferred embodiment, a lithium cobalt oxide (LiCoO$_2$) film is sputtered with a 5 inch LiCoO$_2$ target using an rf-sputtering system equipped with a Materials Research Corp. (Orangeburg, N.Y.) power supply and Consolidated Vacuum Corp. (Rochester, N.Y.) pumping system. Deposition was accomplished in a oxygen atmosphere of 10 millitorr at a 100 watt power setting. Deposition rates of at least 0.4 Å per second were typically obtained.

In the most preferred embodiment, a lithium cobalt oxide film 160 is deposited from a lithium source target 360 using an ion-assisted e-beam thermal evaporation method and system, similar to the preferred deposition method used for cathode and electrolyte films described herein. In this preferred embodiment, the deposition system 300 shown in FIG. 4 is utilized with the following modifications.

An oxygen ion gun 340 comprising a Mark I controller 390 with a Gridless Ion Source (Commonwealth Scientific Corp., Alexandria, Va.) is utilized together with a Model 8960 e-beam thermal evaporator gun 350 (IVI Corp., Pembroke, Mass.) and power supply controller 395. As mentioned previously, the inherent design and operating characteristics for the Commonwealth ion gun 340 provide for an ion beam energy of approximately 60% of the anode voltage. Evaporation of lithium and cobalt is achieved by using a resistively heated sample boat in combination with the e-beam evaporator gun 350. In one embodiment, a lithium source target 360, comprising either lithium metal, lithium intercalated carbon, or lithium compound, such as lithium carbonate, lithium oxide, lithium orthophosphate, or lithium metaphosphate, is used with the e-beam evaporator gun 350. In a preferred embodiment, the lithium source target 360 is used with a resistively heated boat. In a preferred embodiment, a cobalt source target 360, comprising either cobalt metal or cobalt oxide, is heated with an e-beam evaporator gun 350. In another embodiment, the cobalt source target 360 is evaporated with a resistively heated boat.

In one embodiment, the ion beam 340 anode voltage is set at approximately 160 volts, anode current is set at approximately 0.3 amps, and cathode current is approximately 16 amps. In this embodiment, the substrate 310 is pre-sputtered with the oxygen ion gun 340 beam. The ion gun 340 is then shut off as the two source targets 360 are each heated by one of the two e-beam guns 350. Once the source target 360 evaporation commences and deposits start to form on the substrate 310, the ion gun 340 is again switched on deposition proceeds until the desired cathode film thickness is achieved. Typically, cathode film 140 deposition rates of at least 25 Å per second are obtained. In this embodiment, lithium cobalt oxide density of 3.7 g/cm$^3$ was obtained. In a preferred embodiment, the ion beam anode current is set at approximately 1.0 amp. In this embodiment lithium metal and cobalt metal are used as target sources. In this preferred embodiment, a lithium cobalt oxide density of 5.0 g/cm$^3$ is obtained, thus achieving the theoretical density for this material.

In a sixth film layer, a nominally 4000 Å thick current collector film 170 is deposited over the cathode film 160 using the elongated mask positioned parallel to and aligned with the top edge of the substrate 110. In a preferred embodiment, a titanium nitride current collector 130 is deposited over the cathode layer 160 using the method described herein for the second film layer deposition.

In a seventh film layer, a nominally 1200 Å thick anode film 140 is deposited over the current collector 170 using the electrode mask. In a preferred embodiment, a carbon anode 140 is deposited over current collector 170 according to the method described herein for the third film layer deposition. In the most preferred embodiment, the carbon anode 140 is deposited according to the ion assisted deposition method described herein for the third film layer deposition.

In an eighth film layer, a nominally 2.25 μm thick electrolyte film 150 is deposited over the anode 140 using the elongated mask positioned parallel to and aligned with the bottom edge of the substrate 110. In the most preferred embodiment, a lithium phosphorus oxynitride electrolyte 150 is deposited according to the ion assisted deposition method described herein for the fourth film layer deposition.

In a ninth film layer, a nominally 3900 Å thick cathode film 160 is deposited over the electrolyte 140 using electrode mask. In a preferred embodiment, a lithium cobalt oxide cathode 160 is deposited according to the method described herein for the fifth film layer deposition. In the most preferred embodiment, the lithium cobalt oxide cathode 160 is deposited according to the ion assisted deposition method described herein for the fifth film layer deposition.

In a tenth film layer, a nominally 1000 Å thick current collector film 170 is deposited over the cathode 160 using the contact mask. In a preferred embodiment, a titanium nitride current collector 170 is deposited over the cathode layer 160 using the method described herein for the second film layer deposition.

In an eleventh film layer, nominally 1000 Å thick metal contact layer 180 is deposited on the current collector 170 using the contact mask. The contact 120 may deposited using any suitable conductor material and any suitable evaporation or sputtering deposition method. In a preferred embodiment, an aluminum contact layer 180 is deposited with a Model KDTG-3P vacuum thermal evaporation system (Kinney, Boston, Mass.) at a deposition rate of 2000 angstroms per second.

3. Experimental

The performance characteristics of thin film batteries of the present invention were evaluated by subjecting double-cell battery samples to repetitive charge-discharge cycles and measuring the voltage response during cycling. Charging and discharging cycles were typically conducted at a constant current of 10 ramps and test batteries were typically charged up to a fixed voltage of 3.8 volts for test purposes.

Voltage measurements were acquired by means of a 12 bit Lab Master AD data acquisition board (Scientific Solution, Solon, Ohio) inserted in a generic, IBM®-compatible 486 personal computer. The data acquisition measurements and instrumentation was controlled by conventional scripts written in LabView®, a commercial data acquisition and analysis program environment (National Instruments, Austin, Tex.).

Charging and discharging of test batteries was accomplished with and M263 Potentiostat/Galvanostat (EG&G, Princeton, N.J.). The battery voltage was measured with the M263 while the bottom cell voltage was measured with a Keithly® 617 Programmable Electrometer (Keithly Instruments, Cleveland, Ohio). The top cell voltage was calculated from the difference between the battery voltage and the bottom cell voltage.

EXAMPLE 1

Figure 5:
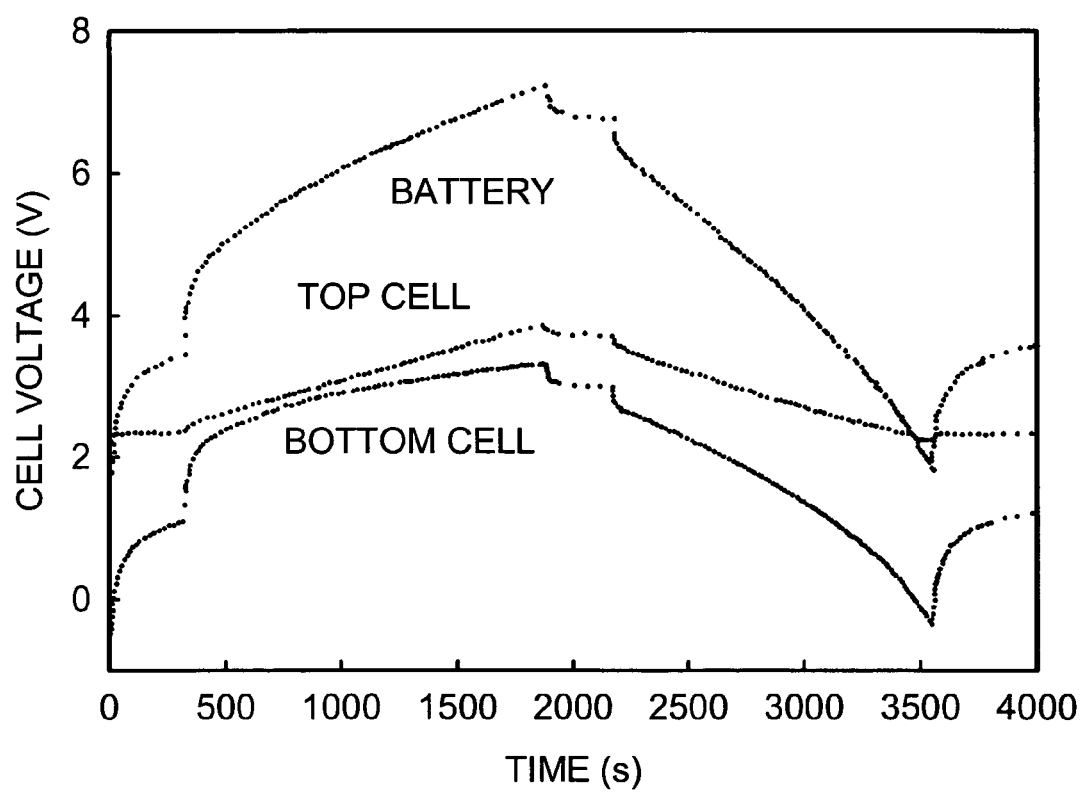
FIG. 5 is a plot of cell voltage vs. time for typical charge-discharge cycles of two adjacent horizontal side-by-side cells and a battery of the present invention.

Typical battery performance results are shown in FIG. 5 for a side-by-side cell configuration with cells having a 1 cm$^2$ area. In this test, the bottom and top cells were measured from cells in two adjacent batteries. For each cycle, the battery was charged at a fixed current of 10 μamps to a fixed charge of 3.8 volts. The measurements shown were taken during the fifteenth battery cycle. As shown by FIG. 5, the individual cell voltages for the charged battery ranged between 3.1 to 3.8 volts while the overall battery voltage after charging was approximately 7.2 volts.

EXAMPLE 2

Figure 6:
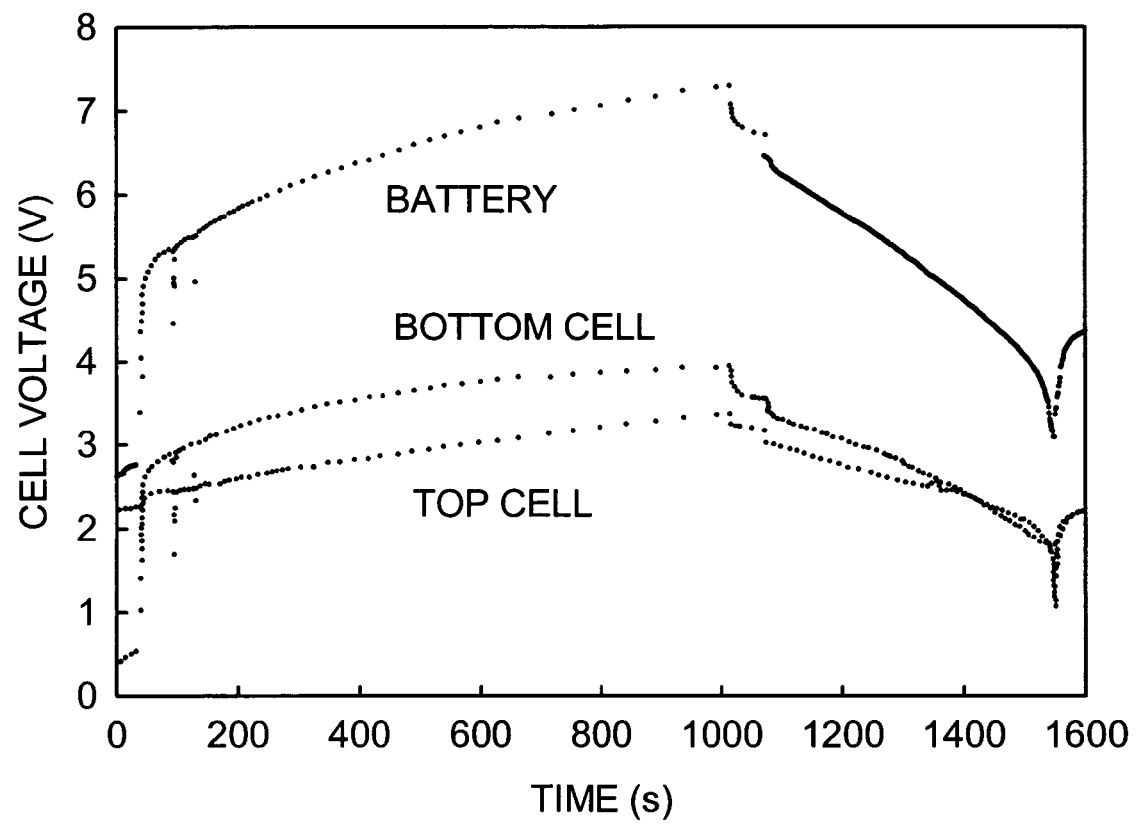
FIG. 6 is a plot of cell voltage vs. time for typical charge-discharge cycles of two adjacent vertically stacked cells and a battery of the present invention.
Figure 7:
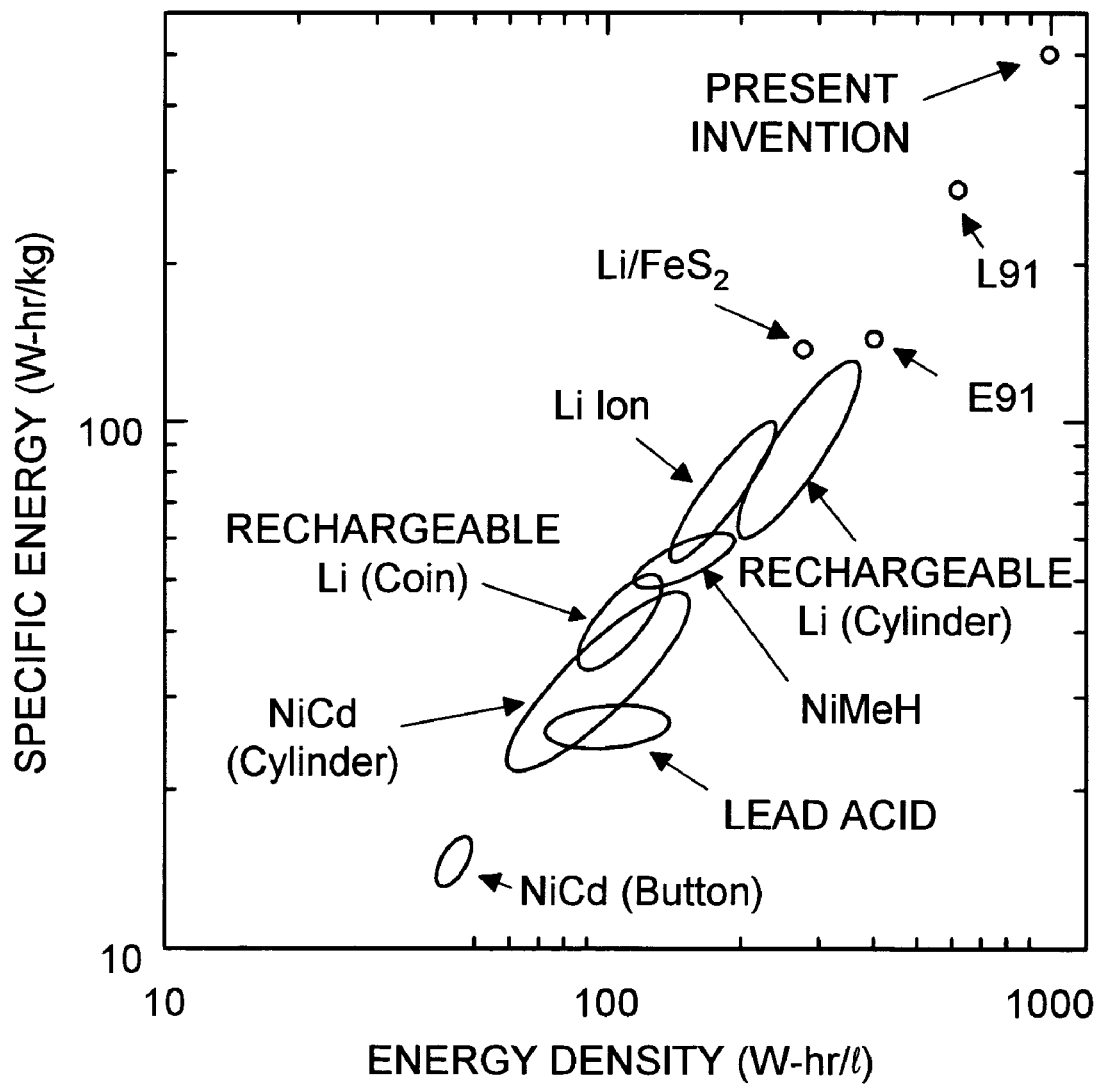
FIG. 7 is a comparative plot of specific energy vs. energy density for prior art batteries and the battery of the present invention.

Typical battery performance results are shown in FIG. 6 for a stacked-cell configuration with cells having a 1 cm$^2$ area. For each cycle, the battery was charged at a fixed current of 10 μamps to a fixed charge of 3.8 volts. The measurements shown were taken during the fourteenth battery cycle. As shown by FIG. 6, the individual cell voltages for the charged battery ranged between 3.2 to 3.8 volts while the overall battery voltage after charging was approximately 7.1 volts.

A thermally evaporated LiPON sample was prepared by electron beam heating of a vacuum melted lithium phosphate in a background nitrogen pressure of $4 \times 10^{-4}$ torr for 15 minutes with a beam current of 35 mA and beam voltage of 10 kV. The resulting deposit was approximately 0.3 μm thick. Surface roughness measurements made on the resultant deposit over an area of approximately 25 um² area indicated that the deposit surface was very smooth with an RMS surface roughness of between 3 and 4 nm.

A sputtered LiPON sample was prepared by rf magnetron sputtering of a sintered 2"×3/16" lithium phosphate target in a background nitrogen pressure of 10 millitorr. The resulting deposit was approximately 0.2 um thick. Surface roughness measurements made on the resultant deposit over an area of approximately 25 um² area indicated that the deposit surface was somewhat irregular with an RMS surface roughness of between 7 and 9 nm.

An ion beam assisted deposition LiPON sample was prepared by the method of the present invention using a vacuum melted lithium phosphorus evaporant target resistance heated in a tungsten evaporation boat and a nitrogen ion beam (9.9 scfm nitrogen, anode voltage=90V, anode current=0.9 amps) in a background nitrogen pressure of $35 \times 10^{-4}$ torr. The film was deposited at a rate of 0.5 nm/s for approximately 1 hour, forming a 1.5 um thick film. The resultant deposit was uniformly rough with pronounced protrusions formed at regular intervals across the surface. Surface roughness measurements made on the resultant deposit over an area of approximately 25 um² area indicated that the measured RMS surface roughness was between 15 and 16 nm.

The topology and surface morphology of the ion beam assisted deposition sample provides for both an increased interfacial surface area as well as a more random crystallographic orientation at the LiPON electrolyte and subsequently deposited electrode interface. This unique deposition topology and film structure provides for better bonding, more intimate interfacial contact, and enhanced transfer of lithium ions across the electrolyte-electrode interface. Additionally, the increase in interface surface area results in a lower current density at equivalent current and provides for faster and more efficient ion diffusion across the electrolyte-electrode interface. Furthermore, the uniformly distributed electrolyte and electrode protrusions produced with this deposition method results in lower space-charge buildup at the interface and a higher breakdown voltage. Additionally, the interfacial protrusions produced by this method provide for more random orientation of the electrolyte and electrode lattices than a flat interface which results in preferred orientation of the fastest lithium ion diffusion pathways at non-parallel angles to the interface. An additional advantage of the IBAD method is the elimination of weak or poorly bonded atoms, physical or chemisorption bonding, and formation of chemical bonds by bombardment of the deposition substrate with ions having high kinetic energy.

Having described the preferred embodiments of the invention, it will now become apparent to one of skill in the art that other embodiments incorporating the concepts may be used. Therefore, it is not intended to limit the invention to the disclosed embodiments but rather the invention should be limited only by the spirit and scope of the following claims.

What is claimed is:

1. A rechargeable, stackable thin film electrochemical cell for a thin film, solid-state battery comprising:
   a dense, non-porous, thin film, unannealed inorganic cathode comprised of a first reversible lithium insertion material, said cathode formed by irradiating a depositing cathode film with an ion source having an ion beam energy of less than 100 eV;
   a dense, non-porous, thin film, inorganic anode comprised of a second reversible lithium insertion material;
   said first and second insertion materials having intrinsically anisotropic crystallographic lithium ion diffusion directions;
   a dense, non-porous, thin film, inorganic, solid-state electrolyte disposed between said cathode and said anode films, said electrolyte film forming a first and second interface respectively with said cathode and anode films;
   a first crystallographic lithium ion diffusion direction of said first insertion material aligned in a predominately non-parallel orientation to said cathode-electrolyte interface; and
   a second crystallographic lithium ion diffusion direction of said second insertion material aligned in a predominately non-parallel orientation to said anode-electrolyte interface.

2. The cell of claim 1 wherein said electrolyte comprises a material selected from the group consisting of lithium phosphorus oxynitride, lithium aluminum germanium phosphate, and lithium aluminum silicate.

3. The cell of claim 2 wherein said electrolyte is deposited as an amorphous material structure formed by exposing one electrode surface to at least one source of energetic ions, said ions having an elemental composition which comprises at least one first component element of said electrolyte, said ion source having an ion beam energy of less than 100 eV, and thermally evaporating onto said electrode surface a material having an elemental composition which comprises at least one second component element of said electrolyte, wherein said energetic ions and said thermally evaporated material combine to form a thin film of said electrolyte.

4. The cell of claim 1 wherein said first reversible lithium insertion material is selected from the group consisting of cobalt oxide, nickel oxide, manganese oxide, vanadium oxide, titanium oxide, iron oxide, chromium oxide, and mixed metal oxides comprising at least two metals selected from the group consisting of cobalt, nickel, manganese, vanadium, titanium, iron and chromium.

5. The cell of claim 4 wherein said cathode first insertion material is a hexagonal crystalline material and said material lithium ion diffusion direction aligned in a predominately non-parallel orientation to said cathode-electrolyte interface is an (003) plane, said orientation being formed without annealing by exposing a surface of either said electrolyte or a first current collector to at least one source of energetic ions, said ions having an elemental composition which comprises at least one component element of said cathode, said ion source having an ion beam energy of less than 100 eV, and thermally evaporating onto said surface a material having an elemental composition which comprises at least one second component element of said cathode, wherein said energetic ions and said thermally evaporated material combine on said surface to form a dense, thin film cathode.

6. The cell of claim 1 wherein said second reversible lithium insertion material is selected from the group consisting of carbon, tin oxide, indium oxide, indium tin oxide and amorphous glasses comprising tin oxide.

7. The cell of claim 6 wherein said anode second insertion material is a hexagonal crystalline material and said material lithium ion diffusion direction aligned in a predominately non-parallel orientation to said anode-electrolyte interface is a c-plane, said c-plane orientation being formed without annealing by exposing a surface of either said electrolyte or a second current collector to at least one source of energetic ions, said ion source having an ion beam energy of less than 100 eV, and thermally evaporating onto said surface a material having an elemental composition which comprises at least one component element of said second insertion material, wherein said energetic ions and said thermally evaporated material interact on said surface to form a dense, thin film anode.

8. The cell of claim 1 further comprised of a first thin film current collector electrically connected to said cathode and a second thin film current collector electrically connected to said anode.

9. The cell of claim 8 wherein said first and second current collectors are comprised a metal selected from the group consisting of aluminum, copper, cobalt, nickel, chromium and alloys of the same.

10. The cell of claim 8 wherein said first and second current collectors consist of an electronically conductive lithium ion blocking layer, said blocking layer providing a barrier to lithium ion diffusion and transport through said current collectors, said blocking layer having a high oxidation resistance to said first insertion material during cell operation.

11. The cell of claim 10 wherein said first and second current collectors are comprised of a metal nitride or mixed metal nitride comprising at least one metallic element selected from the group consisting of titanium, vanadium, zirconium, hafnium, niobium, and tantalum.

12. The cell of claim 1 wherein said first insertion material is cobalt oxide, said second insertion material is graphite and said electrolyte is lithium phosphorous oxide.

13. The cell of claim 1 wherein
said cathode first insertion material is a hexagonal crystalline material and said material lithium ion diffusion direction aligned in a predominately non-parallel orientation to said cathode-electrolyte interface is an (003) plane, said cathode orientation being formed without annealing by exposing a surface of either said electrolyte or said first current collector to at least one source of first energetic ions, said first ions having an elemental composition which comprises at least one component element of said cathode, said first ion source having an ion beam energy of less than 100 eV, and thermally evaporating onto said surface a first material having an elemental composition which comprises at least one second component element of said cathode, wherein said first energetic ions and said first thermally evaporated material combine on said surface to form a dense, thin film cathode; and
said anode second insertion material is a hexagonal crystalline material and said material lithium ion diffusion direction aligned in a predominately non-parallel orientation to said anode-electrolyte interface is a c-plane, said anode orientation being formed without annealing by exposing a surface of either said electrolyte or said second current collector to at least one source of second energetic ions, said second ion source having an ion beam energy of less than 100 eV, and thermally evaporating onto said surface a second material having an elemental composition which comprises at least one first component element of said anode, wherein said second energetic ions and said second thermally evaporated material interact on said surface to form a dense, thin film anode.

14. A multicell, stackable, rechargeable thin film, solid-state battery comprising:
a plurality of thin film battery cells of claim 1, each cathode of said cells electrically connected to a first thin film current collector, each anode of said cells electrically connected to a second thin film current collector;
a first portion of said cells being connected to one another in a stacked series relationship, wherein each of said stacked, series-connected cells is separated from an adjacent stacked, series-connected cell by a shared current collector comprised of an electronically conductive, oxidation resistant, lithium ion blocking layer material; and
a second portion of said cells being connected to one another in a parallel relationship, wherein the cathode of each of said parallel-connected cells is electrically connected to the cathode of said adjacent parallel-connected cells by means of said first current collectors and wherein the anode of each of said parallel-connected cells is connected to the anode of said adjacent parallel-connected cells by means of said second current collectors.

15. The battery of claim 14 wherein said battery has a specific energy of at least 500 Watt-hours per kilogram.

16. The battery of claim 14 wherein said battery has an energy density of at least 1000 Watt-hours per liter.

17. The battery of claim 14 wherein each of said cell electrolytes is deposited as an amorphous material structure formed by exposing an electrode surface to at least one source of energetic ions, said ions having an elemental composition which comprises at least one first component element of said electrolyte, said ion source having an ion beam energy of less than 100 eV, and thermally evaporating onto said electrode surface a material having an elemental composition which comprises at least one second component element of said electrolyte, wherein said energetic ions and said thermally evaporated material combine on said electrode surface to form said electrolyte film.

18. The battery of claim 17 wherein each of said cell cathodes is formed on a surface of said first current collector or of said electrolyte by exposing said surface to at least one source of energetic ions, said ions having an elemental composition which comprises at least one first component element of said cathode, said ion source having an ion beam energy of less than 100 eV, and thermally evaporating onto said surface a material having an elemental composition which comprises at least one second component element of said cathode, wherein said energetic ions and said thermally evaporated material combine to form a thin film cathode on said surface.

19. The battery of claim 17 wherein each of said cell anodes is formed on a surface of said second current collector or of said electrolyte by exposing said surface to at least one source of second energetic ions, said second ion source having an ion beam energy of less than 100 eV, and thermally evaporating onto said surface a first anode material having an elemental composition which comprises at least one first component element of said second insertion material, wherein said second energetic ions and said thermally evaporated anode material interact on said surface to form a dense, non porous, thin film anode on said surface.

20. The battery of claim 14 wherein the electrolyte, cathode and anode of each cell are formed by an ion beam assisted deposition process.

21. The battery of claim 14 wherein said electrolyte comprises a material selected from the group consisting of lithium phosphorus oxynitride, lithium aluminum germanium phosphate, and lithium aluminum silicate.

22. The battery of claim 14 wherein said first reversible lithium insertion material is selected from the group consisting of cobalt oxide, nickel oxide, manganese oxide, vanadium oxide, titanium oxide, iron oxide, chromium oxide, and mixed metal oxides comprising at least two elements selected from the group consisting of cobalt, nickel, manganese, vanadium, titanium, iron and chromium.

23. The battery of claim 14 wherein said second reversible lithium insertion material is selected from the group consisting of carbon, tin oxide, indium oxide, and indium tin oxide.

24. The battery of claim 14 wherein said first and second current collectors are comprised of a metal selected from the group consisting of aluminum, copper, cobalt, nickel, chromium and alloys of the same.

25. The battery of claim 14 wherein said first reversible insertion material is cobalt oxide, said second reversible insertion material is graphite carbon, said electrolyte is lithium phosphorous oxynitride, said first and second current collectors is an aluminum copper alloy, and said shared current collector is titanium nitride.

26. A folded battery configuration of the multicell, stackable, rechargeable, thin film battery of claim 14 comprising:
   a plurality of multi-cell stacks of electrochemical cells, said cells in said stacks electrically connected in series, each of said stacks having an exposed cathode current collector at a proximal end surface, each of said stacks having an exposed anode current collector at a distal end surface;
   a first flexible current collector electrically connected to a plurality of said exposed cathode current collectors;
   a second flexible current collector electrically connected to a plurality of said exposed anode current collectors;
   an electrically insulating material disposed between each of said stacks, said insulating material maintaining separation between said first and said second flexible current collectors so as to prevent electrical contact between said current collectors upon bending said flexible current collectors;
   a first battery terminal in electrical contact with said first flexible current collector, said first flexible current collector so configured as to provide a plurality of bends for making electrical contact with said first terminal; and
   a second battery terminal in electrical contact with said second flexible current collector, said second flexible current collector so configured as to provide a plurality of bends for making electrical contact with said second terminal;
   wherein the number of said multi-cell stacks, the number of said cells in said stacks, and the number and spacing of said bends in said first and said second flexible current collectors are selected so as to establish a characteristic battery operating voltage and current capacity.

27. A low temperature deposition method for making a solid-state, thin film lithium electrochemical cell comprising the steps of:
   depositing a first thin film current collector on a substrate;
   exposing a surface of said first current collector to at least one source of first energetic ions, said first ions having an elemental composition which comprises at least one component element of a first reversible lithium insertion material, said first ion source having an ion beam energy of less than 100 eV;
   thermally evaporating onto said first current collector surface a first evaporant material having an elemental composition which comprises at least one second component element of said first insertion material;
   combining said first energetic ions and said first evaporant material on said first current collector surface to form said first insertion material on said first current collector surface;
   exposing a surface of said first insertion material to at least one source of second energetic ions, said second ions having an elemental composition which comprises at least one first component element of an electrolyte, said first ion source having an ion beam energy of less than 100 eV;
   thermally evaporating onto said first insertion material surface a second evaporant material having an elemental composition which comprises at least one second component element of said electrolyte;
   combining said second energetic ions and said second evaporant material to form a thin film electrolyte on said first insertion material surface;
   exposing a surface of said electrolyte to at least one source of third energetic ions, said ion source having an ion beam energy of less than 100 eV;
   thermally evaporating onto said electrolyte surface a third evaporant material having an elemental composition which comprises at least one component element of said second insertion material;
   contacting said third evaporant material with said third energetic ions on said electrolyte surface to form said second insertion material; and
   depositing a second current collector on a surface of said second insertion material.

28. The method of claim 27 wherein said first insertion material, said second insertion material, said electrolyte, and said second current collector deposition steps are inverted so that said second insertion material is deposited on said first current collector surface, said electrolyte is deposited on said second insertion material surface, said first insertion material is deposited on said electrolyte surface, and said second current collector is deposited on said first insertion material surface.

29. The method of claim 27 wherein said electrolyte is formed from a material selected from the group consisting of lithium phosphorus oxynitride, lithium aluminum germanium phosphate and lithium aluminum silicate.

30. The method of claim 27 wherein said first reversible lithium insertion material is formed from a material selected from the group consisting of cobalt oxide, nickel oxide, manganese oxide, vanadium oxide, titanium oxide, iron oxide, chromium oxide, and mixed metal oxides comprising at least two metals selected from the group consisting of cobalt, nickel, manganese, vanadium, titanium, iron and chromium.

31. The method of claim 27 wherein said second reversible lithium insertion material is formed from a material selected from the group consisting of carbon, graphite, tin oxide, indium oxide, and indium tin oxide.

32. The method of claim 27 wherein said first and second current collectors are selected from the group consisting of aluminum, copper, cobalt, nickel, chromium and an aluminum-copper alloy.

33. The method of claim 27 wherein said electrolyte, said first insertion material and said second insertion material are deposited at an average deposition rate of at least ten angstroms per second.

34. The method of claim 27 wherein said electrolyte, said first insertion material and said second insertion material are deposited at an average deposition rate of at least twenty five angstroms per second.

35. The cell of claim 7 wherein said energetic ions have an elemental composition which comprises at least one second component element of said second insertion material.

36. The cell of claim 13 wherein said second energetic ions have an elemental composition which comprises at least one second component element of said second insertion material.

37. The battery of claim 19 wherein said second energetic ions have an elemental composition which comprises at least one second component element of said second insertion material.

38. The method of claim 27 wherein said third energetic ions have an elemental composition which comprises at least one second component element of said second insertion material.

39. The method of claim 27 wherein said first insertion material is cobalt oxide, said second insertion material is graphite and said electrolyte is lithium phosphorous oxide.

40. A folded battery configuration of multi-cell, stackable, rechargeable, thin film solid-state batteries comprising:
- a plurality of multi-cell stacks of electrochemical cells, each cell comprised of
  - a dense, non-porous, thin film, unannealed inorganic cathode comprised of a first reversible lithium insertion material:
  - a dense, non-porous, thin film inorganic anode comprised of a second reversible lithium insertion material;
  - said first and second insertion materials having intrinsically anisotropic crystallographic lithium ion diffusion directions;
  - a dense, non-porous, thin film, inorganic, solid-state electrolyte disposed between said cathode and said anode films, said electrolyte film forming a first and second interface respectively with said cathode and anode films;
  - a first crystallographic lithium ion diffusion direction of said first insertion material aligned in a predominantly non-parallel orientation to said cathode-electrolyte interface; and
  - a second crystallographic lithium ion diffusion direction of said second insertion material aligned in a predominantly non-parallel orientation to said anode-electrolyte interface;
- each cathode of said cells electrically connected to a first thin film current collector;
- each anode of said cells electrically connected to a second thin film current collector;
- a first portion of said cells being connected to one another in a stacked series relationship, wherein each of said stacked, series-connected cells is separated from an adjacent stacked, series-connected cell by a shared current collector comprised of an electronically conductive, oxidation resistant, lithium ion blocking layer material;
- a second portion of said cells being connected to one another in a parallel relationship, wherein the cathode of each of said parallel-connected cells is electrically connected to the cathode of said adjacent parallel-connected cells by means of said first current collectors and wherein the anode of said parallel-connected cells is connected to the anode of said adjacent parallel-connected cells by means of said second current collectors;
- each of said stacked portion of series-connected cells and said stacked portion of parallel-connected cells being electrically connected in series, each of said stacks having an exposed cathode current collector at a proximal end surface and an exposed anode current collector at a distal end surface;
- a first flexible current collector electrically connected to a plurality of said exposed cathode current collectors;
- a second flexible current collector electrically connected to a plurality of exposed anode current collectors;
- an electrically insulating material disposed between each of said stacks, said insulating material maintaining a separation between said first and said second flexible current collectors so as to prevent electrical contact between said current collectors upon bending said flexible current collectors;
- a first battery terminal in electrical contact with said first flexible current collector, said firs flexible current collector so configured as to provide a plurality of bends for making electrical contact with said first terminal; and
- a second battery terminal in electrical contact with said second flexible current collector, said second flexible current collector so configured as to provide a plurality of bends for making electrical contact with said second terminal;
- wherein the number of said multi-cell stacks, the number of said cells in said stacks, and the number and spacing of bends in said first and said second flexible current collectors are selected so as to establish a characteristic battery operating voltage and current capacity.

* * * * *